US012625370B2

(12) United States Patent
Jang et al.

(10) Patent No.: US 12,625,370 B2
(45) Date of Patent: May 12, 2026

(54) HOLOGRAPHIC VR DISPLAY

(71) Applicant: Meta Platforms Technologies, LLC,
Menlo Park, CA (US)

(72) Inventors: Changwon Jang, Kirkland, WA (US);
Afsoon Jamali, Issaquah, WA (US);
Zhimin Shi, Bellevue, WA (US)

(73) Assignee: Meta Platforms Technologies, LLC,
Menlo Park, CA (US)

( * ) Notice: Subject to any disclaimer, the term of this
patent is extended or adjusted under 35
U.S.C. 154(b) by 456 days.

(21) Appl. No.: 18/105,223

(22) Filed: Feb. 2, 2023

(65) Prior Publication Data

US 2024/0168433 A1     May 23, 2024

Related U.S. Application Data

(60) Provisional application No. 63/426,338, filed on Nov.
17, 2022.

(51) Int. Cl.
  G03H 1/22       (2006.01)
  G02B 27/01      (2006.01)
  (Continued)

(52) U.S. Cl.
  CPC ....... G02B 27/0172 (2013.01); G02F 1/1335
  (2013.01); G02F 1/134363 (2013.01); G03H
  1/2286 (2013.01); G03H 1/2294 (2013.01);
  G06F 1/163 (2013.01); *G02B 27/0093*
  (2013.01); *G02B 2027/0174* (2013.01); *G02B*
  *2207/117* (2013.01);
  (Continued)

(58) Field of Classification Search
  CPC ............ G02B 27/0172; G02B 27/0093; G02B 2027/0174; G02B 2207/117; G02F
1/1335; G02F 1/134363; G02F 2203/12;
G03H 1/2286; G03H 1/2294; G03H
1/2205; G03H 2001/0224; G03H
2001/2207; G03H 2223/16; G03H
2223/23; G03H 2223/24; G03H 2225/34;
G06F 1/163
See application file for complete search history.

(56) References Cited

U.S. PATENT DOCUMENTS 8,068,710 B2 * 11/2011  Bita ..................... G02B 6/0035
                                                             349/122
10,678,188 B2 *  6/2020  Zschau ................ G03H 1/2294
(Continued)

OTHER PUBLICATIONS

Kim Y-H., et al., "Crafting a 1.5 μm Pixel Pitch Spatial Light
Modulator using Ge2Sb2Te5 Phase Change Material," Journal of
the Optical Society of America A, vol. 36, Issue 12, Dec. 2019, pp.
D23-D30.

*Primary Examiner* — Christopher E Leiby
(74) *Attorney, Agent, or Firm* — Greenberg Traurig, LLP

(57)           ABSTRACT

A holographic display includes an illuminator, a spatial light
modulator (SLM) coupled to the illuminator, and an ocular
lens coupled to the SLM. The illuminator provides a wide-
area illuminating light beam to illuminate the SLM with a
spatially homogeneous beam of light. The illuminator may
include a slab waveguide with an evanescent out-coupler, or
a beam expander based on a diffraction grating with an
oblique angle of incidence and a near-normal angle of
diffraction of the illuminating light. A low-pass spatial filter
may be provided to filter out higher diffraction orders of the
illuminating light diffracted on the SLM.

19 Claims, 19 Drawing Sheets

(51) Int. Cl.
    *G02F 1/1335*     (2006.01)
    *G02F 1/1343*     (2006.01)
    *G06F 1/16*     (2006.01)
    *G02B 27/00*     (2006.01)
    *G03H 1/02*     (2006.01)

(52) U.S. Cl.
    CPC .............. *G03H 2001/0224* (2013.01); *G03H 2001/2207* (2013.01); *G03H 2223/16* (2013.01); *G03H 2223/23* (2013.01); *G03H 2223/24* (2013.01); *G03H 2225/34* (2013.01)

(56)                 References Cited

U.S. PATENT DOCUMENTS

| | | | | |
|---|---|---|---|---|
| 10,871,825 | B1 * | 12/2020 | Sztuk | G06F 3/011 |
| 12,298,550 | B2 * | 5/2025 | Schowengerdt | G06F 1/203 |
| 2010/0067075 | A1 * | 3/2010 | Schwerdtner | G03H 1/08 |
| | | | | 359/9 |
| 2012/0092750 | A1 * | 4/2012 | Kroll | G03H 1/02 |
| | | | | 362/559 |
| 2019/0086598 | A1 * | 3/2019 | Futterer | G02B 27/48 |
| 2019/0361163 | A1 * | 11/2019 | Ayres | G03H 1/041 |
| 2020/0192097 | A1 * | 6/2020 | Kim | C07D 401/14 |
| 2021/0026135 | A1 * | 1/2021 | Ishii | G02B 27/0101 |
| 2021/0302738 | A1 * | 9/2021 | Calafiore | G02B 6/3596 |
| 2022/0091560 | A1 | 3/2022 | Jang et al. | |
| 2022/0397767 | A1 * | 12/2022 | Wang | G02B 27/283 |
| 2023/0358941 | A1 * | 11/2023 | Nichol | G02B 6/002 |

* cited by examiner

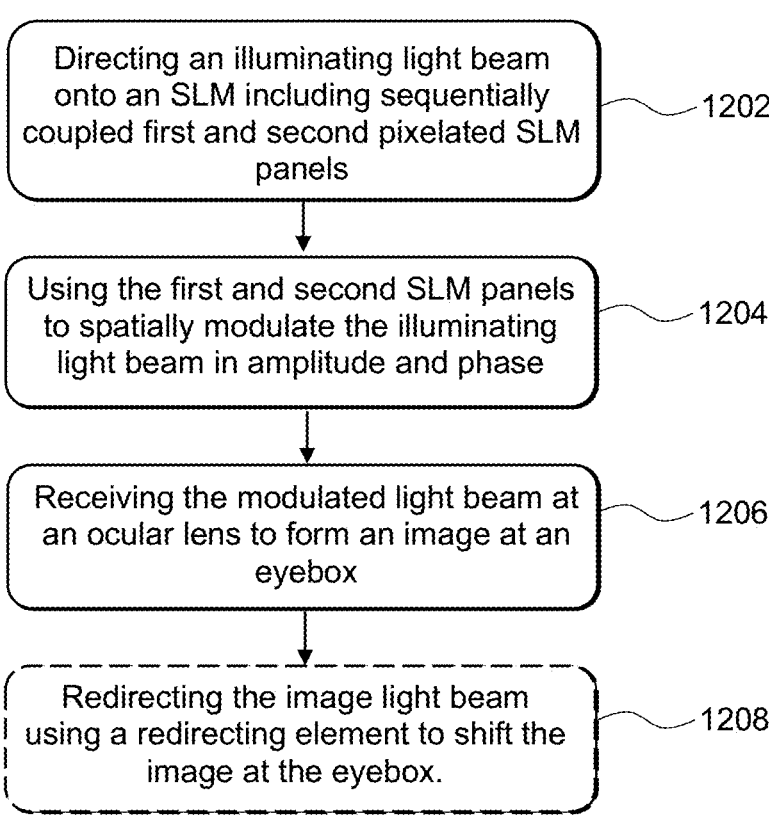

1200

Directing an illuminating light beam onto an SLM including sequentially coupled first and second pixelated SLM panels —1202

Using the first and second SLM panels to spatially modulate the illuminating light beam in amplitude and phase —1204

Receiving the modulated light beam at an ocular lens to form an image at an eyebox —1206

Redirecting the image light beam using a redirecting element to shift the image at the eyebox. —1208

FIG. 12

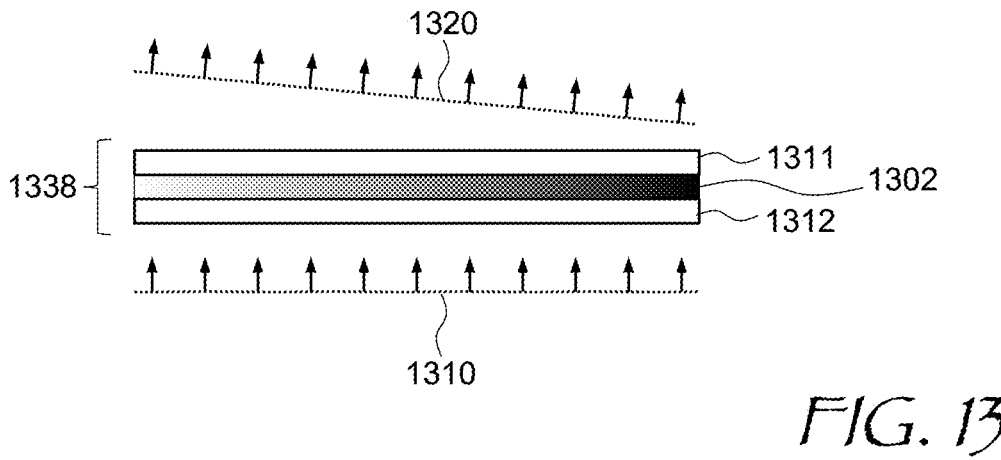
FIG. 13
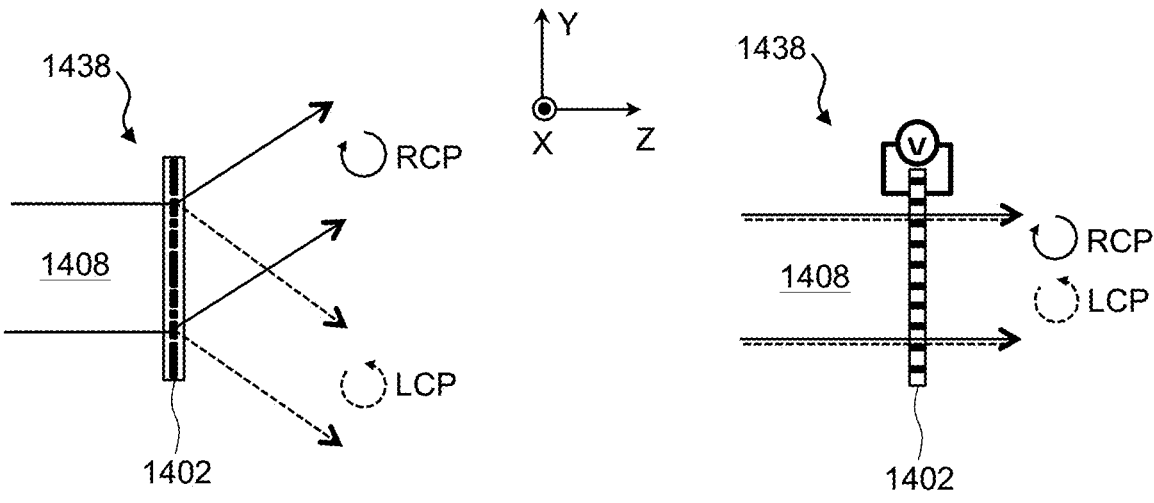
FIG. 14A
FIG. 14B

HOLOGRAPHIC VR DISPLAY

REFERENCE TO RELATED APPLICATION

This application claims priority from U.S. Provisional Patent Application No. 63/426,338 entitled "HOLO-GRAPHIC VR DISPLAY", filed on Nov. 17, 2022 and incorporated herein by reference in their entirety.

TECHNICAL FIELD

The present disclosure relates to optical devices, and in particular to holographic display systems and modules.

BACKGROUND

Head mounted displays (HMD), helmet mounted displays, near-eye displays (NED), and the like are being used for displaying virtual reality (VR) content, augmented reality (AR) content, mixed reality (MR) content, etc. Such displays are finding applications in diverse fields including entertainment, education, training and science, to name just a few examples. The displayed VR/AR/MR content can be three-dimensional (3D) to enhance the experience and to match virtual objects to real objects observed by the user.

To provide better optical performance, display systems and modules may include various components such as lenses, waveguides, display panels, gratings, etc. Because a display of an HMD or NED is usually worn on the head of a user, a large, bulky, unbalanced, and/or heavy display device would be cumbersome and may be uncomfortable for the user to wear. Compact, lightweight, and energy-efficient head-mounted display devices and modules are desirable.

BRIEF DESCRIPTION OF THE DRAWINGS

Exemplary embodiments will now be described in conjunction with the drawings, in which:

FIG. 12 is a flow chart of a method for displaying content to a user using a pair of SLM panels;

FIG. 13 is a side cross-sectional view of an LC beam steering device for use in a holographic display of this disclosure;

FIG. 14A is a side cross-sectional view of a Pancharatnam-Berry phase (PBP) beam deflector in a deflecting state, for use in a holographic display of this disclosure;

FIG. 14B is a side cross-sectional view of the PBP beam deflector of FIG. 14A in a non-deflecting state;

DETAILED DESCRIPTION

Figure 1:
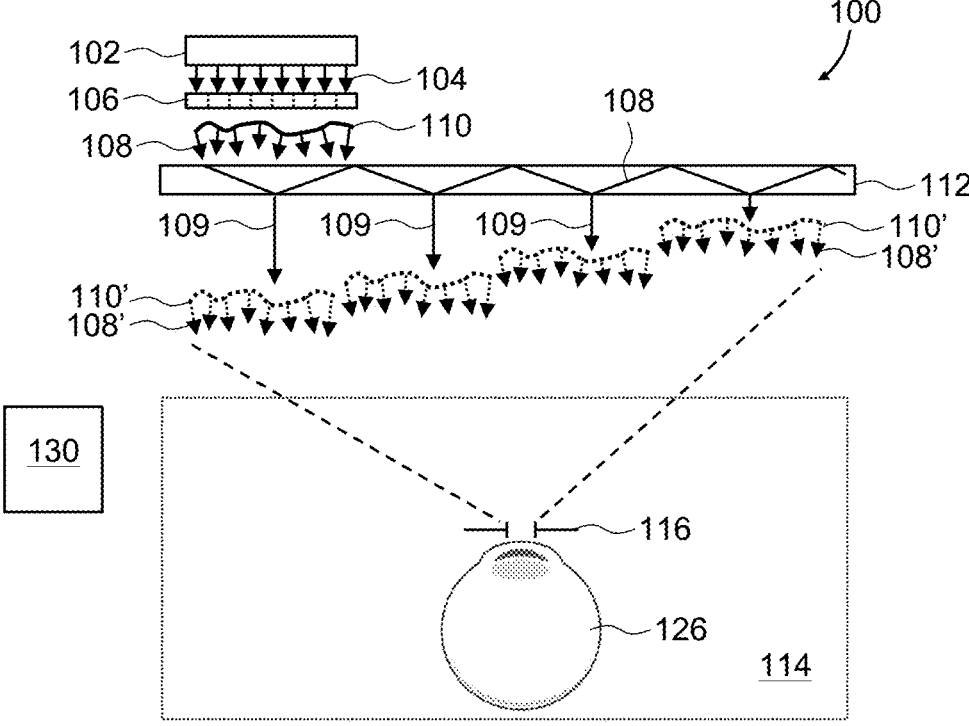
FIG. 1 is a schematic view of a replicating lightguide based holographic display of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1 to 4, FIG. 6, and FIG. 17, similar reference numerals denote similar elements.

A holographic display includes a spatial light modulator (SLM) in an optical configuration that reproduces a wavefront of a light field carrying an image to an exit pupil of the display. The image may be directly observed by a user when the user's eye is placed at the exit pupil. One advantage of a holographic display configuration is that the depth of field is reproduced naturally; that is, remote objects in the image require different eye focusing than near objects, such that there is no vergence-accommodation conflict. A challenge of a holographic display is that the eye needs to remain at the exit pupil to observe the image. Once the eye is shifted relative to the exit pupil, the image is no longer visible.

This disclosure utilizes a replicating lightguide that guides image light by series of total internal reflections (TIRs) from their outer surfaces, while out-coupling parallel shifted portions of the image light, thereby providing light coverage across an eyebox of the display, and enabling the image to be observed at a plurality of locations of the eye. In some embodiments, a replicating lightguide is replaced with a slab-type singlemode or multimode waveguide, and/or a diffractive beam expander to expand the light beam illuminating the SLM. In displays disclosed herein, replicating lightguides and/or beam-expanding waveguides are used in a holographic display configuration, enabling one to combine the advantage of depth of field afforded by a holographic display configuration with the ability to observe the displayed scenery at more than one eyebox location. In some embodiments, an effective exit pupil may be expanded by replicating the exit pupil at an array of laterally offset locations in a time-sequential manner.

In accordance with the present disclosure, there is provided a holographic display comprising an illuminator comprising a substrate, a slab core layer on the substrate for guiding a light beam therein, a cladding layer on the slab core layer, and a light extractor on the cladding layer. The light extractor has a refractive index higher than an effective refractive index of a mode of propagation of light in the slab core layer, for evanescent out-coupling of the light beam from the slab core layer into the light extractor, thereby forming an illuminating light beam. The holographic display further comprises a spatial light modulator (SLM) operably coupled to the illuminator for receiving and spatially modulating the illuminating light beam in amplitude and phase to provide an image light beam.

A thickness of the cladding layer may decrease in a direction of propagation of the light beam to improve a spatial uniformity of light extraction by the light extractor. The cladding layer and the slab core layer may be configured for singlemode propagation of the light beam in the slab core layer. The light extractor may include a prism having first and second faces at an acute angle to one another, with the first face coupled to the cladding layer, and the second face including a reflector for reflecting light out-coupled by the prism to propagate back through the waveguide and to impinge onto the SLM.

The holographic display may further comprise an ocular lens operably coupled to the SLM for receiving the image light beam and forming an image at an eyebox of the holographic display for observation by a user's eye. A beam redirector may be disposed in an optical path of the image light between the SLM and the ocular lens, for controllably redirecting the image light beam. The beam redirector may include e.g. a tunable liquid crystal redirector of the image light beam, and/or a stack of active Pancharatnam-Berry phase (PBP) layers configured for switching a direction of propagation of the image light beam.

In some embodiments, the holographic display may further include an eye tracking system for determining a position of a pupil of the user's eye in the eyebox, and a controller operably coupled to the eye tracking system and the beam redirector for causing the beam redirector to controllably redirect the image light beam towards the eye pupil position determined by the eye tracking system.

In accordance with the present disclosure, there is provided a holographic display comprising a beam expander comprising a diffractive layer for diffracting a collimated light beam at an angle of incidence exceeding an angle of diffraction, whereby a lateral size of the collimated light beam increases upon diffraction on the diffractive layer, and an SLM operably coupled to the beam expander for receiving the light beam diffracted by the diffractive layer and spatially modulating the light beam in amplitude and phase to provide an image light beam. In operation, the image light beam propagates through the diffractive layer. In some embodiments, the angle of incidence is at least 75 degrees, and the angle of diffraction is no greater than 15 degrees. The diffractive layer may include e.g. a volume Bragg grating and/or a polarization volume hologram.

In some embodiments, the beam expander further comprises first and second prismatic elements each comprising a diagonal face, the first prismatic element further comprising a side face joining the diagonal face of the first prismatic element. The diffractive layer may be sandwiched between the diagonal faces of the first and second prismatic elements. In operation, the collimated light beam may be received at the side face of the first prismatic element.

The holographic display may further include an ocular lens operably coupled to the SLM for receiving the image light beam and forming an image at an eyebox of the holographic display for observation by a user's eye, and/or a beam redirector in an optical path of the image light between the SLM and the ocular lens, for controllably redirecting the image light beam. The beam redirector may include e.g. a tunable liquid crystal beam redirector, and/or a stack of active PBP layers configured for switching a direction of propagation of the image light beam. In embodiments where the holographic display comprises an eye tracking system for determining a position of a pupil of the user's eye in the eyebox, a controller may be operably coupled to the eye tracking system and the beam redirector for causing the beam redirector to controllably redirect the image light beam towards the eye pupil position determined by the eye tracking system.

In accordance with the present disclosure, there is provided a holographic display comprising a frontlight illuminator for providing an illuminating light beam, an SLM operably coupled to the frontlight illuminator for receiving and spatially modulating the illuminating light beam in amplitude and phase to provide an image light beam propagating through the frontlight illuminator, an ocular lens operably coupled to the SLM for receiving the image light beam and forming an image at an eyebox of the holographic display for observation by a user's eye, and a low-pass spatial filter in an optical path of the image light beam between the SLM and the ocular lens, for blocking higher orders of diffraction of the illuminating light beam on the SLM while propagating a zeroth order of diffraction of the illuminating light beam.

Referring now to FIG. 1, a holographic display 100 includes an illuminator 102 for providing an illuminating light beam 104. A spatial light modulator (SLM) 106 is optically coupled to the illuminator 102 for receiving and spatially modulating a phase, an amplitude, or both the phase and the amplitude, of the illuminating light beam 104, to provide an image light beam 108 having a spatially varying wavefront 110. The wavefront 110 has a plurality of ridges and valleys as a result of the spatial modulation of the amplitude and phase.

A replicating lightguide 112 is optically coupled to the SLM 106 for receiving the image light beam 108 and providing multiple laterally offset portions 108', or replicas, of the image light beam 108. The portions 108' of the image light beam 108 have wavefronts 110'. The portions 108' propagate to an eyebox 114 of the display 100 and undergo optical interference, i.e. coherently add or subtract, depending on local relative optical phase, at an exit pupil 116 of the holographic display 100 in the eyebox 114. Herein, the term "eyebox" means a geometrical area where an image of acceptable quality may be observed by a user of the holographic display 100.

The SLM 106 modulates the image light beam 108 with a pre-computed amplitude and/or phase distribution, such that the portions 108' of the image light beam 108 of the display add or subtract coherently at an exit pupil 116 to form an image for direct observation by a user's eye 126 located at the exit pupil 116. In some embodiments, the amplitude and phase distribution may be computed by a controller 130 from the image to be displayed by numerically solving a following matrix equation describing the optical interference of the image light beam 108 portions 108' with wavefronts 110' at the exit pupil 116:

$$H - M \cdot S \tag{1}$$

where H is the desired (target) hologram, S is a solution (amplitude and phase modulation of the illuminating light beam 104), and M is a matrix of transformation accounting for coherent interference of the portions 108' at the exit pupil 116. For phase-only modulation, the equation may become non-linear. Iterative or encoding-based methods may be employed to compute a hologram from a non-linear equation.

The SLM 106 may operate in transmission or reflection, and may include a liquid crystal (LC) array, a microelectromechanical system (MEMS) reflector array, or be based on any other suitable technology. The replicating lightguide 112 may be e.g. a plano-parallel transparent plate including input and output grating couplers for in-coupling the image light beam 108 and out-coupling portions 108' at a plurality of offset locations 109, as illustrated in FIG. 1. The grating couplers may include, for example, surface relief grating (SRG) couplers, volume Bragg grating (VBG) couplers, etc. The image light beam 108 propagates in the plano-parallel plate by a series of total internal reflections (TIRs). In some embodiments, the plano-parallel plate may include an embedded partial reflector running parallel to the plate, to increase the density of pupil replication.

Figure 2:
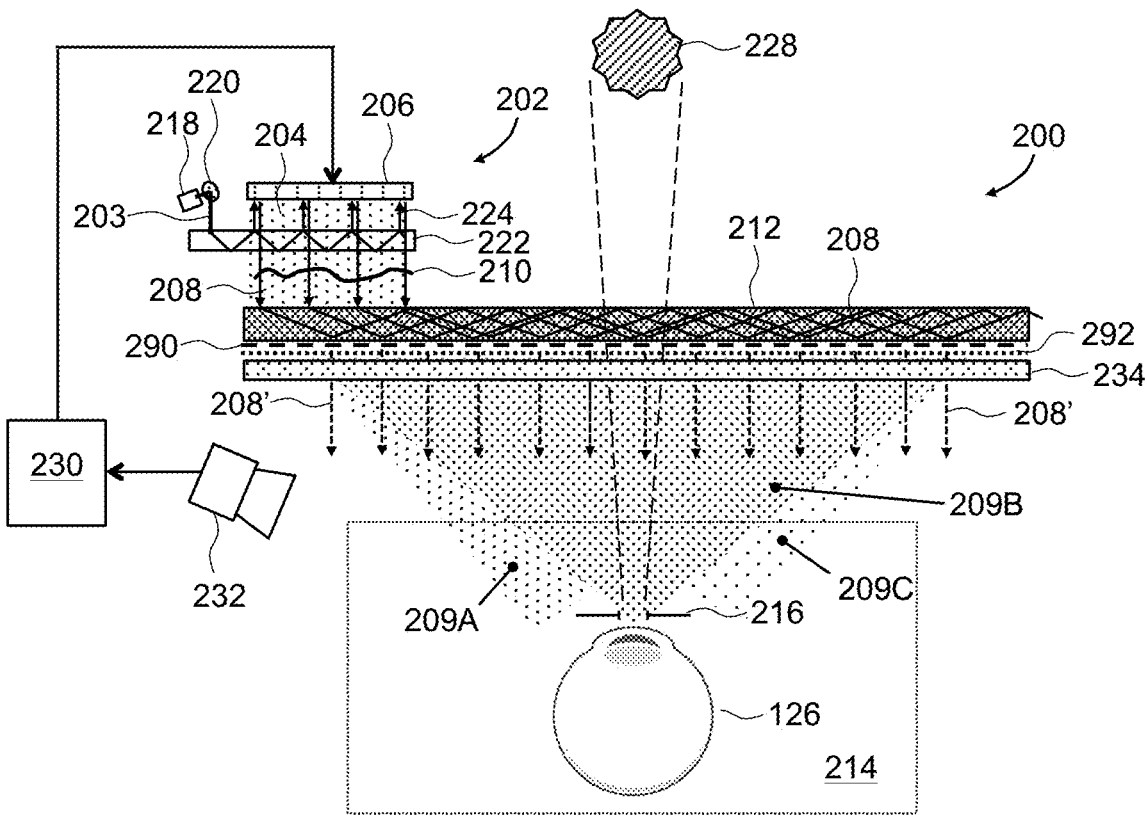
FIG. 2 is a cross-sectional exploded view of a display embodiment using an illumination replication lightguide.

Several embodiments of a holographic display with replicating lightguide(s) will now be considered. Referring first to FIG. 2, a holographic display 200 is an embodiment of the holographic display 100 of FIG. 1, and includes similar elements. An illuminator 202 of the holographic display 200 of FIG. 2 includes a light source 218 emitting a collimated light beam 203. The light source 218 is operably coupled, e.g. via a reflector 220 which may be tiltable, to a source replicating lightguide 222. The source replicating lightguide 222 is configured to provide multiple portions 224 of the collimated light beam 203, forming an illuminating light beam 204 for illuminating a reflective SLM 206. The source replicating lightguide 222 may include input and output grating couplers for in-coupling the collimated light beam 203 and out-coupling the multiple portions 224 of the collimated light beam 203.

The reflective SLM 206 is configured to form an image light beam 208 by reflecting the illuminating light beam 204 with spatially variant phase delays and/or spatially modulated amplitude or reflection coefficient. A wavefront of the image light beam 208 is illustrated at 210. The image light beam 208 propagates back through the source replicating lightguide 222 and towards an image replicating lightguide 212, which is analogous to the replicating waveguide 112 of the display 100 of FIG. 1. The image light beam 208 propagates back through the source replicating lightguide 222 without any further multiple reflections, i.e. straight down in FIG. 2.

The image replicating lightguide 212 forms multiple portions 208' of the image light beam 208. The portions 208' may be focused by an ocular or a focusing element 234 such as a lens, for example. The portions 208' are gathered to an exit pupil 216, and optically interfere at the exit pupil 216, forming an image that may be observed by the user's eye 126 placed near the exit pupil 216, as illustrated in FIG. 2.

The image 212 and/or source 222 replicating lightguides may include grating couplers for in-coupling and out-coupling the illuminating light or image light. The grating couplers may include, for example, SRG couplers, Bragg grating couplers, etc. In some embodiments, the plano-parallel plate may include an embedded partial reflector running parallel to the plate, to increase density of pupil replication.

The holographic display 200 may further include a controller 230 operably coupled to the SLM 206. The controller 230 may be configured, e.g. wired and/or programmed, to compute the shape of the spatially varying wavefront 210 such that the portions 208' of the image light beam 208 add or subtract coherently at the exit pupil 216 of the display 200 to form the image for direct observation by the user's eye 126. The controller 230 may then provide a control signal to the reflective SLM 206 to spatially modulate the illuminating light beam 204, providing the image light beam 208 at the output. Since the image is formed holographically, complex optical fields representing three-dimensional target images may be formed at the exit pupil 216. The shape of the spatially varying wavefront 210 may be computed such that, for example, a close virtual object 228 appears to the eye 126 as if present at a finite distance from the eye 126, enabling the eye 126 to be naturally focused at the object 228, thereby alleviating the vergence-accommodation conflict.

The image replicating lightguide 212 may include a grating out-coupler 290 for out-coupling the portions 208' of the image light beam 208 from the image replicating lightguide 212. In some embodiments, the grating out-coupler 290 may be configured to also scatter up a small portion, e.g. up to 0.01%, 0.1%, or up to 1% of intensity of at least some of the portions 208' of the image light beam 208, within a certain scattering angle, e.g. no greater than 3 degrees, or no greater than 10 degrees, or more. To provide the scattering capacity, a scattering material may be added to the grating out-coupler 290.

In some embodiments, the scattering may be achieved by forming the grating coupler using a couple of recording beams, one being a clean plane- or spherical wave beam, and the other being slightly scattered beam. Surface relief gratings (SRG) may also be used. Alternatively, a separate diffuse scatterer 292 may be disposed downstream of the grating out-coupler 290, for scattering at least a portion of optical power of the portions 208' of the image light beam 208. The function of adding a diffuse scatterer, either to the grating out-coupler 290 or as the separate diffuse scatterer 292, is to reduce the spatial coherence or correlation between individual portions 208' of the image light beam 208, which may be beneficial for computation and optimization of the shape of the spatially varying wavefront 210, by relieving constraints of such a computation. In some instances, the presence of a diffuse scatterer may further enhance the etendue of the holographic display 200 enabling one e.g. to increase the field of view (FOV) of the holographic display 200. Such a diffuse scatterer may also be added to the display 100 of FIG. 1, either as a separate scatterer downstream of the replicating lightguide 112 or a scattering out-coupler of the replicating lightguide 112.

The holographic display 200 may further include an eye tracking system 232 configured to sense the user's eye 126 and determine a position of an eye pupil in an eyebox 214. The controller 230 may be operably coupled to the eye tracking system 232 to set a position of the exit pupil 216 of the holographic display 200 based on the position of the eye 126 pupil determined by eye tracking system 232. Once the position of the exit pupil 216 is set, the controller 230 may compute the amplitude and/or phase distribution of the image light beam 208 from the image to be displayed by numerically solving an equation describing the optical interference of the image light beam 208 portions 208' at the location of the exit pupil 216. Other locations at the eyebox 214 may be ignored in this computation to speed up the computation process.

In some embodiments, the reflector 220 is a tiltable reflector that may steer the collimated light beam 203 in a desired direction upon receiving a corresponding control signal from the controller 230. When the collimated light beam 203 is steered by the reflector 220, the angle of incidence of the collimated light beam 203 onto the source replicating waveguide 222 changes. Multiple portions 224 of the collimated light beam 203 are steered accordingly, because the source replicating waveguide 222 preserves the pointing angle of the collimated light beam 203. The multiple portions 224 of the collimated light beam 203 form the illuminating light beam 204, which repeats the steering of the collimating light beam 203. The angle of the illuminating light beam 204 is converted by the focusing element 234 into a position of the focal spot of the illuminating light beam 204. This enables one to steer the image light beam 208 portions 208' e.g. between a variety of positions 209A, 209B, and 209C. Steering the image light beam 208 portions 208' enables one to steer a larger portion of the image light beam 208 towards the exit pupil 216, thereby increasing the illumination of the exit pupil 216 of the holographic display 200, and ultimately improving light utilization by the holographic display 200.

Figure 3:
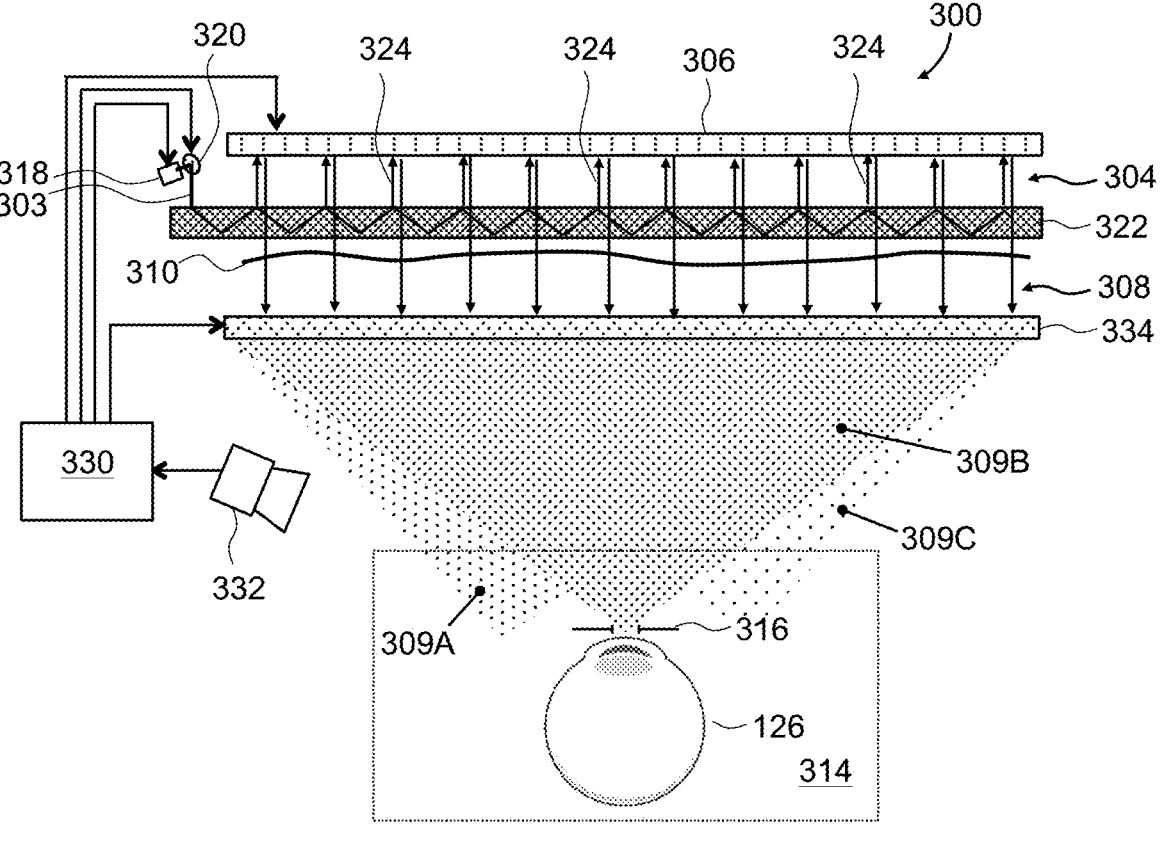
FIG. 3 is a cross-sectional exploded view of a full-aperture lightguide illuminator display of this disclosure.

Referring now to FIG. 3, a holographic display 300 includes a light source 318 emitting a collimated light beam 303. The light source 318 is optically coupled to a tiltable reflector 320 which can steer, or variably redirect, the collimated light beam 303 upon receiving a corresponding command from a controller 330 operably coupled to the tiltable reflector 320. A replicating lightguide 322 is optically coupled to the tiltable reflector 320 for receiving the collimated light beam 303 and providing multiple laterally offset parallel portions 324 of the collimated light beam 303 (shown with short upward pointing arrows). Together, the multiple laterally offset parallel portions 324 form an illuminating light beam 304.

An SLM 306 is optically coupled to the replicating lightguide 322. The SLM 306 receives and spatially modulates the illuminating light beam 304 in amplitude, phase, or both, producing an image light beam 308 having a wavefront 310. The SLM 306 is a reflective SLM in this embodiment. A focusing element 334 may be optically coupled to the SLM 306. The focusing element 334 focuses the image light beam 308 at an exit pupil 316 of the holographic display 300, forming an image for direct observation by the user's eye 126.

In FIG. 3, the SLM 306 is configured to form the image light beam 308 by reflecting the illuminating light beam 304 with at least one of spatially variant reflectivity or spatially variant phase. Upon reflection, the image light beam 308 propagates back through the replicating lightguide 322 and towards the focusing element 334. More generally, the SLM 306 may operate in transmission or reflection. The SLM 306 may include an LC array, a MEMS reflector array, a combination of LC/MEMS arrays, etc. The replicating lightguide 322 may be a plano-parallel transparent plate including input and output grating couplers for in-coupling the collimated light beam 303 and out-coupling the portions 324 at a plurality of offset locations, as illustrated. The grating couplers may include, for example, SRG couplers, VBG couplers, etc. In some embodiments, the plano-parallel plate may include an embedded partial reflector running parallel to the plate, to increase density of pupil replication.

The holographic display 300 may further include an eye tracking system 332 configured to sense the user's eye 126 and determine a position of an eye pupil relative to an eyebox 314. The controller 330 may be operably coupled to the eye tracking system 332 to operate the tiltable reflector 320 to redirect the collimated light beam 303 to redirect the illuminating light beam 304 between a plurality of positions 309A, 309B, and 309C, and generally towards the pupil of the user's eye 126. The controller 330 may be further configured to set a position of the exit pupil 316 of the display 300 based on the position of the eye 126 pupil determined by eye tracking system 332. Once the position of the exit pupil 316 is set, the controller 330 may compute the amplitude and phase distribution of the image light beam 308 from the image to be displayed at the exit pupil 316. The computation may be dependent upon an optical configuration used.

In some embodiments, the focusing element 334 may include a varifocal element, such as a lens having a switchable focal length, for example, a switchable Pancharatnam-Berry Phase (PBP) lens, a stack of switchable PBP lenses, a metalens, etc. The controller 330 may be operably coupled to the switchable lens(es) and configured to switch the switchable lens(es) to shift the exit pupil 316 of the display 300 to the eye 126 pupil, e.g. to better match the eye relief distance of a particular user. The switchable lens(es) may also be used to change the location of virtual objects in 3D space. In some embodiments, the focusing element 334 may further include a steering element such as a switchable grating, for example. The varifocal and/or steering focusing element 334 may be used in combination with the tiltable reflector 320 to separate the focus modulation and shift modulation, or use both to expand the shifting angle.

Figure 4:
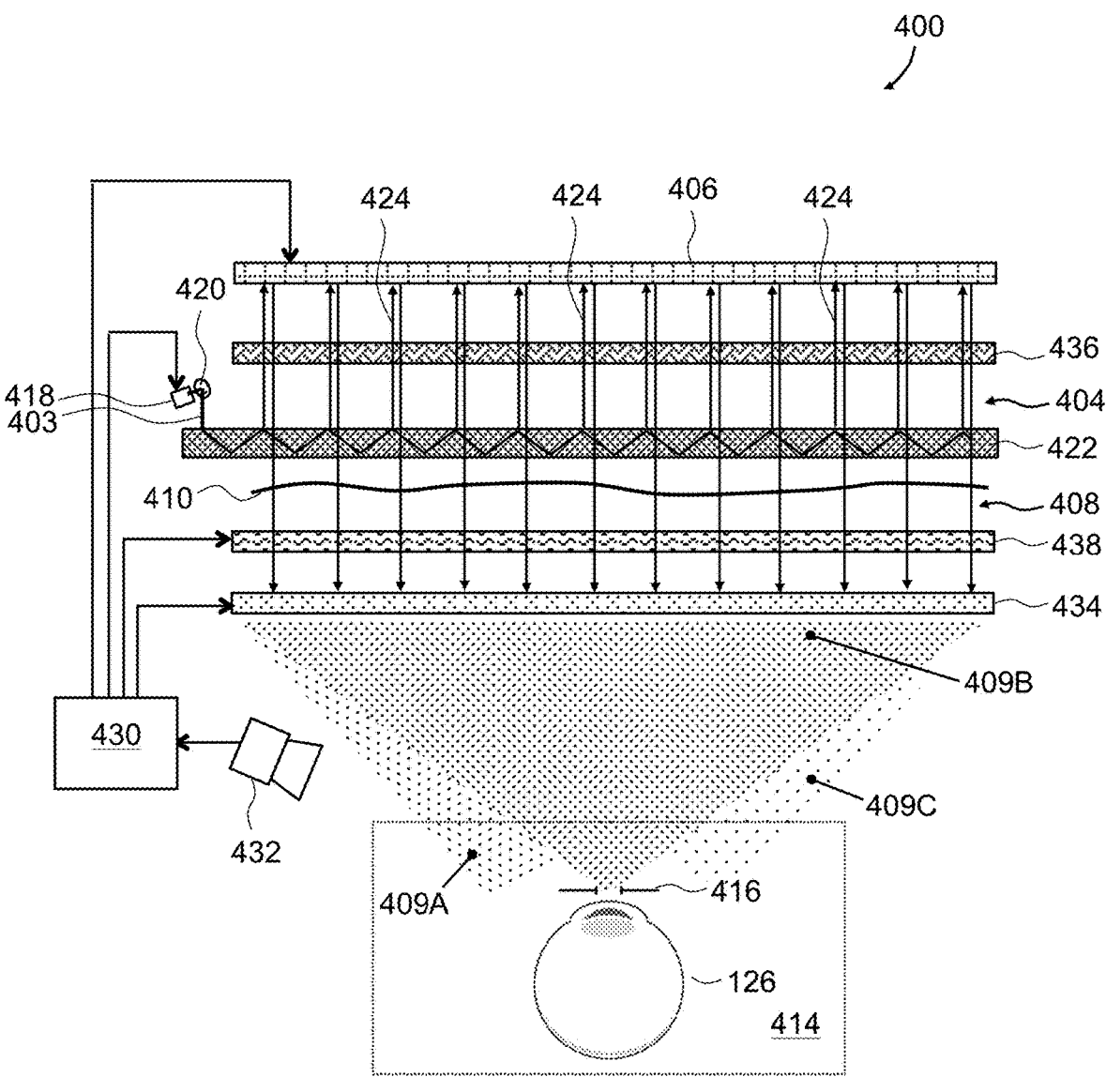
FIG. 4 is a cross-sectional exploded view of a display of this disclosure based on a full-aperture light steering stack.

Turning to FIG. 4, a holographic display 400 is similar to the holographic display 300 of FIG. 3, and includes similar elements. The holographic display 400 of FIG. 4 includes an illuminator 418 for providing a collimated light beam 403. A replicating lightguide 422 is optically coupled to the illuminator 418 e.g. by a reflector 420. The replicating lightguide 422 receives the collimated light beam 403 and provides multiple laterally offset parallel portions 424 of the collimated light beam 403. The portions 424 form an illuminating light beam 404, which propagates through an optional angular filter 436 and impinges onto an SLM 406. The SLM 406 receives and spatially modulates the illuminating light beam 404 in at least one of amplitude or phase, so as to encode an image information onto a wavefront 410 of an image light beam 408. In the embodiments shown in FIG. 4, the SLM 406 is a reflective SLM forming the image light beam 408 by reflecting the illuminating light beam 404 with at least one of spatially variant reflectivity or spatially variant optical phase. It is to be understood that the multiple laterally offset parallel portions 424, although shown as perpendicular to the replicating lightguide 422 and the SLM 406, may propagate at an oblique angle w.r.t. the replicating lightguide 422. Furthermore, the image light beam 408, although shown as collimated perpendicular to the replicating lightguide 422 and the SLM 406, may be diverging/converging or may have a complex shape of the wavefront 410.

The image light beam 408 propagates through the angular filter 436. The purpose of the angular filter 436 is to block non-zero orders of diffraction, which may appear upon spatially modulating the illuminating light beam 404 by the SLM 406. The angular filter 436 may include a volume hologram, for example. Then, the image light beam 408 propagates straight through the replicating lightguide 422, i.e. substantially without being captured or redirected by the replicating lightguide 422.

A beam redirector 438 is disposed in an optical path downstream of the SLM 406 for variably redirecting the image light beam 408 between a plurality of positions 409A, 409B, and 409C, and generally towards the pupil of the user's eye 126. To that end, the beam redirector 438 may include an LC steering element, a switchable diffraction grating, a switchable PBP grating or a binary stack of such gratings, a metalens, etc. A focusing element 434 is disposed in the optical path downstream of the SLM 406 for focusing the image light beam 408 at an exit pupil 416 of the display 400 to form an image for direct observation by the user's eye 126. The focusing element 434 may include, for example, a diffractive lens, a refractive lens, a Fresnel lens, a PBP lens, or any combination or stack of such lenses. The order of the beam redirector 438 and the focusing element 434 may be reversed; furthermore, in some embodiments, the focusing 434 and redirecting 438 elements may be combined into a single stack and/or a single optical subassembly enabling variable steering and focusing of the image light 408.

An eye tracking system 432 may be provided. The eye tracking system 432 may be configured to sense the user's eye 126 and determine a position and/or orientation of the eye pupil relative to an eyebox 414. A controller 430 may be operably coupled to the SLM 406, the beam redirector 438, and the eye tracking system 432. The controller 430 may be configured to obtain the position of the eye pupil from the eye tracking system 432, cause the beam redirector 438 to redirect the image light beam 408 towards the eye pupil position, and cause the SLM 406 to spatially modulate the illuminating light beam 404 so as to generate a desired image at the exit pupil 416. The focusing element 434 may include comprises a varifocal element operably coupled to the controller 430. The controller 430 may be configured to adjust a focal length of the varifocal element to shift the exit pupil of the display 400 to the position of the eye pupil of the user's eye 126.

The holographic display 200 of FIG. 2, the holographic display 300 of FIG. 3, and the holographic display 400 of FIG. 4 use pupil-replicating lightguides 222, 322, and 422 to expand the illuminating light beams 203, 303 and 403 by providing multiple offset portions 224, 324, and 424 of the collimated light beams 203, 303 and 403, respectively. Non-limiting illustrative examples of such multi-beam expanders of illuminating light are presented in FIGS. 5A, 5B, and 5C.

Figures 5A, 5B, 5C:
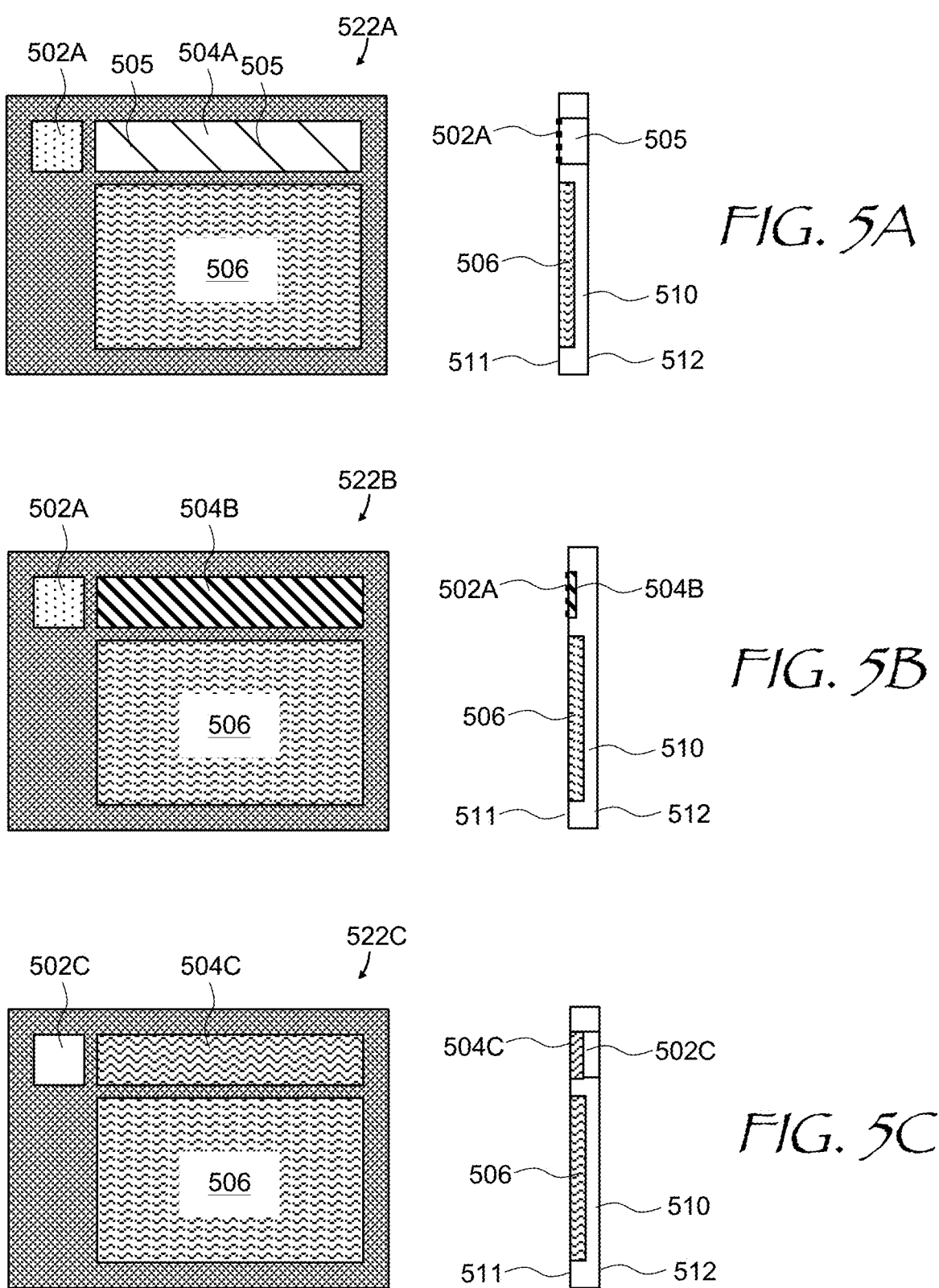
FIG. 5A includes plan and side cross-sectional views of a multi-beam expander for a holographic display of this disclosure, the multi-beam expander including an array of partial mirrors.
FIG. 5B includes plan and side cross-sectional views of a multi-beam expander for a holographic display of this disclosure, the multi-beam expander including a surface-relief grating (SRG)
FIG. 5C includes plan and side cross-sectional views of a multi-beam expander for a holographic display of this disclosure, the multi-beam expander including a volume Bragg grating (VBG)

Referring first to FIG. 5A, a multi-beam expander 522A includes a slab 510 of transparent material such as glass, plastic, sapphire, etc. The slab 510 has first 511 and second 512 opposed parallel surfaces. The multi-beam expander 522A includes an in-coupler 502A, in this example a volume Bragg grating (VBG) coupler, and an out-coupler 506, in this example a VBG coupler as well. The multi-beam expander 522A may further include a beam expanding section 504A, which in this example includes a plurality of slanted partial bulk mirrors 505. In operation, the in-coupler 502A in-couples a light beam from a light source into the slab 510 to propagate in the slab 510 by alternating internal reflections from the first 511 and second 512 surfaces through the beam expanding section 504A. The slanted partial bulk mirrors 505 redirect portions of the light beam downwards in FIG. 5A, towards the out-coupler 506, which in its turn out-couples laterally offset portions of the light beam forming an illuminating light beam for illuminating of the SLM.

Referring now to FIG. 5B, a multi-beam expander 522B is similar to the multi-beam expander 522A of FIG. 5A, and includes similar elements. The multi-beam expander 522B of FIG. 5B includes the slab 510, the VBG in-coupler 502A, and the VBG out-coupler 506. The multi-beam expander 522B may further have a beam expanding section 504B, which includes a surface-relief grating. In operation, the in-coupler 502A in-couples a light beam from a light source into the slab 510 to propagate in the slab 510 by alternating internal reflections from the first 511 and second 512 surfaces through the beam expanding section 504B, which diffracts portions of the light beam downwards in FIG. 5B, towards the out-coupler 506. The our-coupler 506 out-couples laterally offset portions of the light beam forming an illuminating light beam for illuminating of the SLM.

Turning to FIG. 5C, a multi-beam expander 522C is similar to the multi-beam expander 522A of FIG. 5A, and includes similar elements. The multi-beam expander 522C of FIG. 5C includes the slab 510, a slanted mirror in-coupler 502C, and the VBG out-coupler. The multi-beam expander 522C may further have a beam expanding section 504C, which in this example includes a VBG. In operation, the in-coupler 502C in-couples a light beam from a light source into the slab 510 to propagate in the slab 510 by alternating internal reflections from the first 511 and second 512 surfaces through the beam expanding section 504B, which diffracts portions of the light beam downwards in FIG. 5C, towards the out-coupler 506. The our-coupler 506 out-couples laterally offset portions of the light beam forming an illuminating light beam for illuminating of the SLM.

One drawback of the multi-beam expanders 522A, 522B, and 522C is that the laterally offset portions of the wide illuminating light beam may interfere with one another causing local optical power density and phase variations of the wide illuminating light beam. The optical power density/phase variations of the wide light beam may be calibrated out by pre-emphasizing the SLM amplitude/phase response to offset or compensate the variations. However, such compensations often attenuate but not completely eliminate such variations due to calibration errors, temperature changes, etc. The residual calibration errors tend to be noticeable due to their periodic nature. Furthermore, such compensations take away from the dynamic range of the SLM, leaving less of the dynamic range for holographic image generation.

Figure 6:
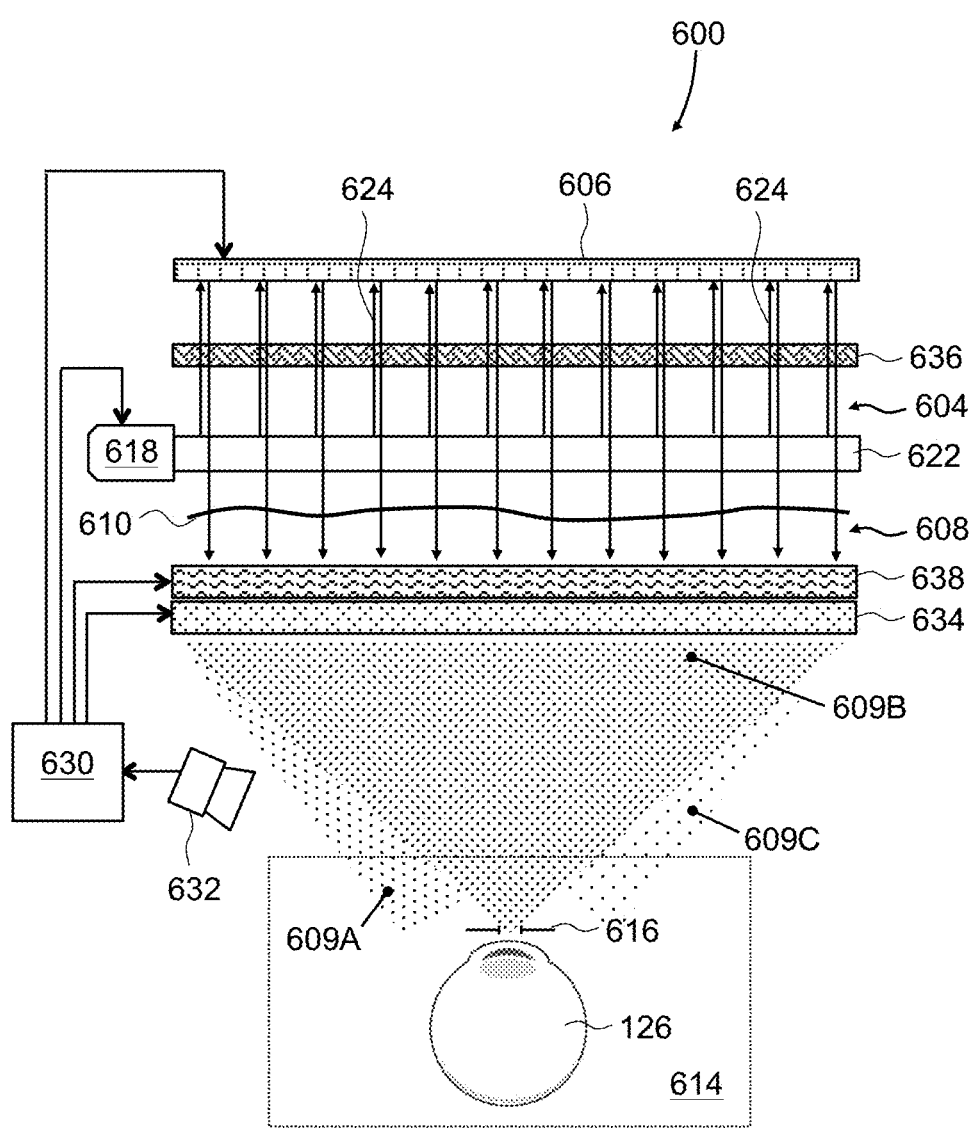
FIG. 6 is a schematic view of a holographic display with a single-beam expander.

In accordance with this disclosure, a continuous, wide-beam illuminator may be provided for a holographic display. The wide illuminating beam is free of local intensity or phase modulations caused by multi-beam nature of the compound wide beam. Referring for a non-limiting illustrative example to FIG. 6, a holographic display 600 is similar to the holographic display 400 of FIG. 4, but has an illuminator providing a wide homogeneous beam. The illuminator of the holographic display 600 of FIG. 6 includes a light source 618 and a single-beam expander 622 optically coupled the light source 618 (FIG. 6). The single-beam expander 622 expands a light beam of the light source 618, providing a wide homogeneous illuminating beam represented by upward facing arrows 624. The wide homogeneous illuminating beam propagates through an optional angular filter 636 and impinges onto an SLM 606. The SLM 606 receives and spatially modulates the wide illuminating beam in at least one of amplitude or phase, so as to encode an image information onto a wavefront 610 of an image light beam 608 represented by downward facing arrows. It is to be understood that the image light beam 608, although shown with parallel downward arrows, may be diverging/converging, or may have a complex shape of the wavefront 610.

The image light beam 608 propagates through the angular filter 636, which blocks non-zero orders of diffraction. Then, the image light beam 608 propagates through the single-beam expander 622 without being captured or redirected by the single-beam expander 622.

A beam redirector 638 is disposed in an optical path downstream of the SLM 606 for variably redirecting the image light beam 608 e.g. between a plurality of positions 609A, 609B, and 609C, and generally towards the pupil of the user's eye 126. A focusing element 634, also termed "ocular lens", is disposed in the optical path downstream of the SLM 606 for focusing the image light beam at an exit pupil 616 of the display 600 to form an image for direct observation by the user's eye 126. The beam redirector 638 and the focusing element 634 are similar to those of the holographic display 400 of FIG. 4. The order of the beam redirector 638 and the focusing element 634 (FIG. 6) may be reversed. Furthermore, the focusing and redirecting elements may be combined into a single stack and/or a single optical subassembly enabling variable steering and focusing of the image light 408.

An eye tracking system 632 may be provided in the holographic display 600. The eye tracking system 632 may be configured to image the user's eye 126 and determine a position and/or orientation of the eye pupil relative to an eyebox 614. A controller 630 may be operably coupled to the SLM 606, the beam redirector 638, and the eye tracking system 632. The controller 630 may be configured to obtain the position of the eye pupil from the eye tracking system 632, cause the beam redirector 638 to redirect the image light beam 608 towards the eye pupil position, and cause the SLM 606 to spatially modulate the illuminating light beam 604 so as to generate a desired image at the eye pupil position. To that end, the controller 630 may be configured to adjust a focal length of the focusing element to shift the exit pupil 616 of the display 600 to the position of the eye pupil of the user's eye 126.

Figure 7:
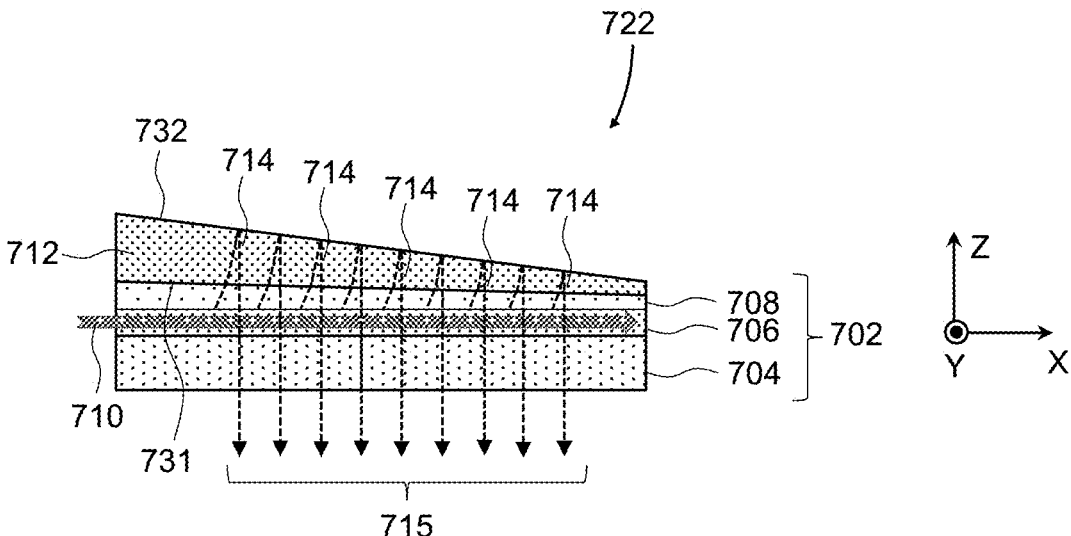
FIG. 7 is a side cross-sectional view of a singlemode slab waveguide embodiment of the single-beam expander of FIG. 6.

Example embodiments of the single-beam expander 622 will now be considered. Referring first to FIG. 7, an evanescent beam expander 722 includes a slab waveguide 702, e.g. a singlemode slab waveguide, having a substrate 704, a slab core layer 706 on the substrate 704, and a cladding layer 708 over the core layer 706. Thickness of the cladding layer 708 may change, i.e. may vary spatially, in a direction of light 710 propagation in the core layer 706. The light 710 propagates in X-direction in FIG. 7, and the thickness (measured in Z-direction) gradually decreases in going along the X-direction, i.e. left to right in FIG. 7.

A light extractor 712, e.g. a thin prism, is disposed on the top cladding layer 708. The light extractor 712 has a refractive index $n_{ext}$ higher than an effective refractive index $n_{eff}$ of a mode of propagation of the light 710 in the slab waveguide 702, and the cladding layer 708 is thin enough for evanescent out-coupling of the light 710 from the core layer 706 into the light extractor 712. By way of illustration, the thickness of the cladding layer 708 may be between 0.3 and 3 micrometers, or even between 0.1 micrometer and 5 micrometers in some embodiments.

In operation, the light 710 propagates in the core layer 706 in X-direction, as shown with a gray arrow. Portions 714 of the light 710 are out-coupled into the light extractor 712 as the light 710 propagates in the core layer 106. Angle θ (relative to the waveguide normal) at which the portions 714 are out-coupled depends only on the ratio of the effective refractive index n eff of the waveguide mode to the refractive index $n_{ext}$ of the extractor 712:

$$\theta = a\ \sin(n_{eff}/n_{ext}) \tag{1}$$

Eq. (1) follows from the law of momentum conversion applied to light. The rate of light tunneling is controlled by the thickness of the cladding layer 708.

The thickness of the cladding layer 708 may decrease in the direction of the light 710 propagation (i.e. along X-axis), so as to offset depleting optical power level of the light 710 as portions 714 are evanescently out-coupled, and thereby increase spatial uniformity of homogeneous collimated light 715 out-coupled from the core layer 706 through the top cladding layer 708 and into the light extractor 712. The wedging may be obtained, for example, by low resolution greytone etching techniques. There may be an AR coating between the cladding layer 708 and the light extractor 712. The AR coating may be applied to either top of the cladding 708, the bottom of the light extractor 712, or both, depending on the refractive index of the light extractor 712, the cladding layer 708, and the bonding material used.

In the embodiment shown, the light extractor 712 is a thin prism, e.g. thinner than 1 mm, having first 731 and second 732 faces forming a small acute angle. The second face 732 may include a reflector, e.g. metal or dielectric reflector, for reflecting the light portions 714 out-coupled by the prism to propagate back through the slab waveguide 702 at an angle close to normal angle. For example, for 0.95 mm tall light extractor 712, the angle may be about 26 degrees; it may be as low as within 15 degrees of the normal angle for some materials. The reflector at the second face 732 may be polarization selective in some embodiments. In applications where a wider beam is needed, a thicker prism may be used. The prism's height may still remain less than one half of the beam diameter in that case. The second face 732 may be polished to a radius of curvature, so that the reflector has an optical (i.e. focusing or defocusing) power. It is noted that the term "prism", as used herein, includes prisms with curved outer faces.

Figure 8A:
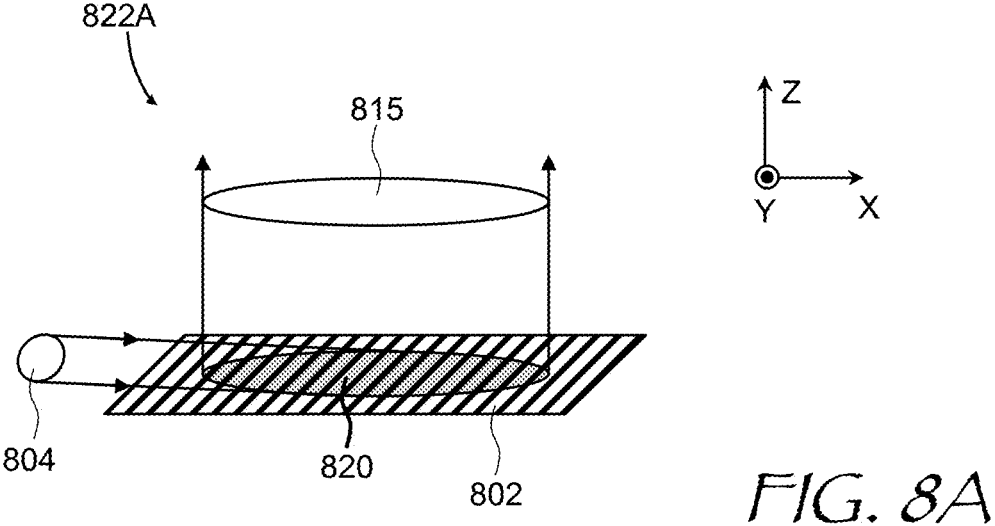
FIG. 8A is a schematic view of a single-beam expander comprising a diffractive layer.

Referring now to FIG. 8A, a diffractive beam expander 822A includes a diffractive layer 802 configured for diffracting a collimated light beam 804 at an oblique angle of incidence, such that a beam spot 820 of the collimated light beam 804 on the diffractive layer 802 is elongated as shown.

The collimated light beam 804 diffracts by the diffractive layer 802 at an angle of diffraction close to a normal angle, i.e. the angle of diffraction is small as compared to the angle of incidence. For example, the angle of incidence may be at least 75 degrees, and the angle of diffraction may be no greater than 15 degrees. As a result, a lateral size (X-size in this example) of a diffracted light beam 815 is greater than the diameter of the impinging collimated light beam 804. Thus, the size of the collimated light beam measured along X-axis (i.e. X-size) increases upon diffraction on the diffractive layer 802.

Figure 8B:
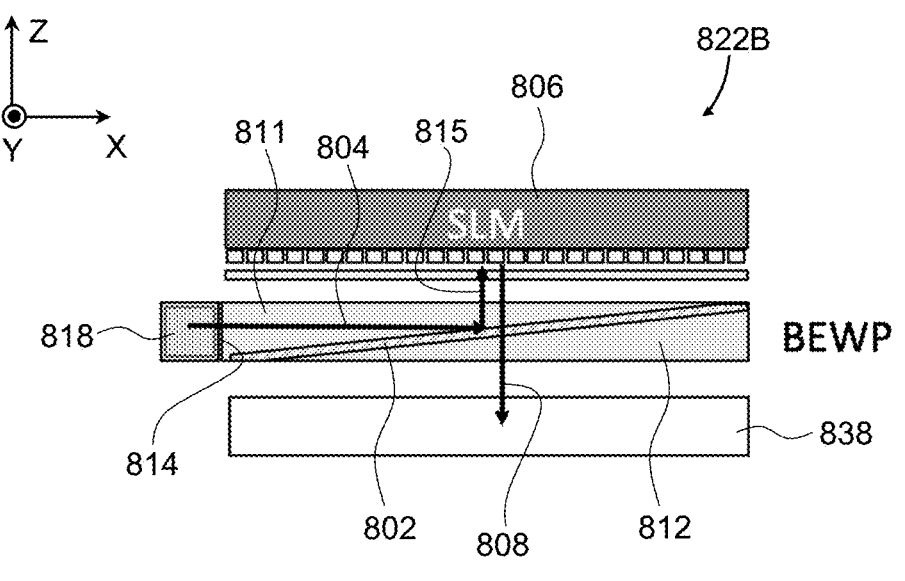
FIG. 8B is a side cross-sectional view of an embodiment of the single-beam expander of FIG. 8A used to illuminate a reflective spatial light modulator (SLM)

Turning to FIG. 8B, an embodiment 822B of the diffractive beam expander 822A of FIG. 8A includes first 811 and second 812 prismatic elements each having a diagonal face, the diagonal faces of the first 811 and second 812 prismatic elements facing each other. The first prismatic element 811 includes a side face 814 joining its diagonal face, for receiving the light beam 804, which is emitted by a light source 818. The diffractive layer 802 is sandwiched between the diagonal faces of the first 811 and second 812 prismatic elements. The diffractive layer 802 may include a volume Bragg grating (VBG) and/or a polarization volume hologram (PVH), for example. The assembly is termed herein "beam-expanding wedge prism" (denoted as BEWP in FIG. 8B). The purpose of the BEWP is to expand the collimated light beam 804 along X-axis, and redirect the expanded light beam towards the SLM 806.

In operation, the light source 818 emits the collimated light beam 804, which enters the first prismatic element 811 at the side face 814. The collimated light beam 804 diffracts on the diffractive layer 802, increasing its X-size, as explained above with reference to FIG. 8A. The diffracted light beam 815 is reflected by an SLM 806, modulating its amplitude and/or phase and providing a modulated light beam 808. The modulated light beam 808 may be redirected by a beam redirector 838, e.g. a Pancharatnam-Berry phase (PBP) stack, a tunable LC steerer, or a stack thereof, for steering the modulated light towards the user's eye.

Figure 9:
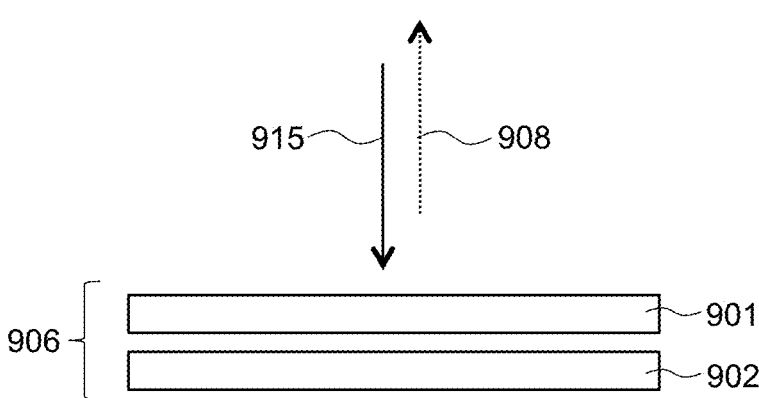
FIG. 9 is a side cross-sectional view of a compound SLM of this disclosure.

Example embodiments of the SLM 606 of the holographic display 600 of FIG. 6 will now be considered. The embodiments to be considered also apply to the holographic displays 100, 200, 300, and 400 of FIGS. 1, 2, 3, and 4 respectively, and to the SLM 806 of FIG. 8B. Referring first to FIG. 9, an SLM 906 includes sequentially coupled first 901 and second 902 pixelated SLM panels for spatially modulating an illuminating light beam 915 in amplitude and phase to provide an image light beam 908. In some embodiments, one of the first 901 or second 902 pixelated SLM panels may perform an amplitude modulation, and the other one may perform the phase modulation. In some embodiments, the first 901 and second 902 SLM panels work together to provide both amplitude and phase modulation. The first 901 and/or second 902 SLM panels may include, for example, liquid crystal (LC) panels including liquid crystal on silicon (LCoS) panels, in-plane switching (IPS) LC panels, and/or a binary phase change material SLM including a polymer layer having a bistable optical phase. The first 901 and/or second 902 SLM panels may also include microelectromechanical system (MEMS) panels.

In operation, the light may propagate through the second SLM panel 902, impinge onto the first SLM panel 901, get reflected thereby, and propagate back through the second SLM panel 902. It is to be noted that although the SLM 906 is shown as a reflective SLM where the illuminating 915 and image 908 light beams are counter-propagating, SLM configurations are also possible where the illuminating 915 and image 908 light beams propagate generally in a same direction.

Figure 10:
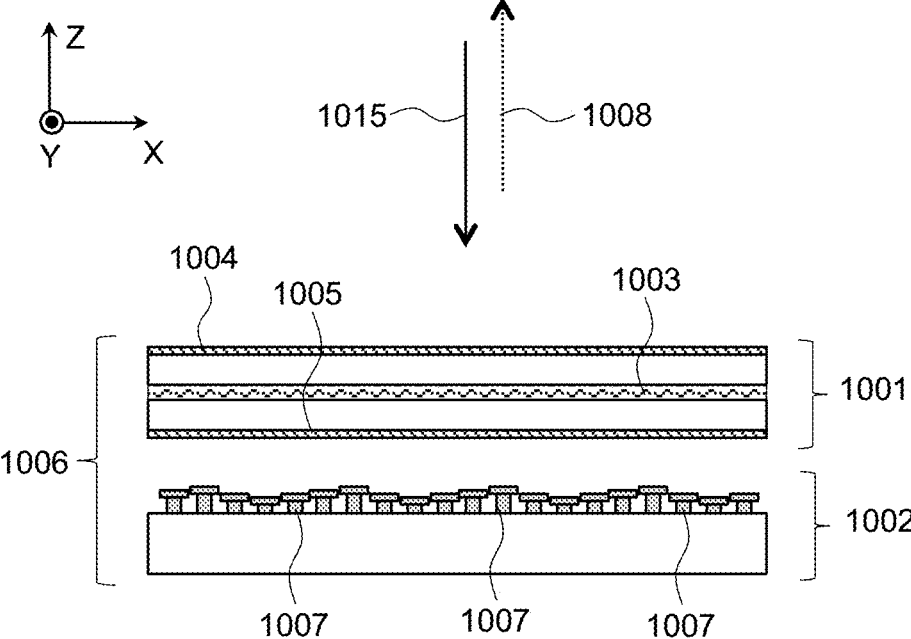
FIG. 10 is a side cross-sectional view of a compound amplitude/phase SLM of FIG. 9 including serially coupled reflective microelectromechanical system (MEMS) and liquid crystal (LC) SLM panels.

Referring to FIG. 10 for a non-limiting illustrative example of a reflective dual-panel configuration, a reflective SLM 1006 includes a pixelated LC panel 1001 and an array 1002 of MEMS reflectors sequentially coupled to the pixelated LC panel. The pixelated LC panel 1001 may include an array of LC light valves for modulating an impinging illuminating light beam 1015 in amplitude. For example, the LC light valves may tune polarization of impinging light, and the pixelated LC panel 1001 may include an LC layer 1003 between a pair of polarizers 1004, 1005, one for polarizing the impinging illuminating light beam 1015, and one for converting the polarization distribution into the optical power density distribution, thus modulating the impinging light beam in amplitude. In some embodiments, only the top polarizer 1004 is provided. Polarizerless configurations of the LC panel 1001 are also possible.

In the embodiment shown, the array 1002 of MEMS reflectors is an array of piston-type MEMS reflectors 1007 for modulating the impinging light beam in phase. The height of each piston-type MEMS reflector 1007 is individually adjustable along Z-axis, thus modulating the impinging light beam1008 in phase. In operation, the illuminating light beam 1015 propagates through the pixelated LC panel 1001, impinges onto the array 1002 of piston-type MEMS reflectors 1007, gets reflected by the piston-type MEMS reflectors 1007, and propagates back through the pixelated LC panel 1001, forming an image light beam 1008 modulated in amplitude—by double-pass propagation through the pixelated LC panel 1001, and phase—by reflecting from the piston-type MEMS reflectors 1007 of the array 1002 of piston-type MEMS reflectors 1007.

Figure 11A:
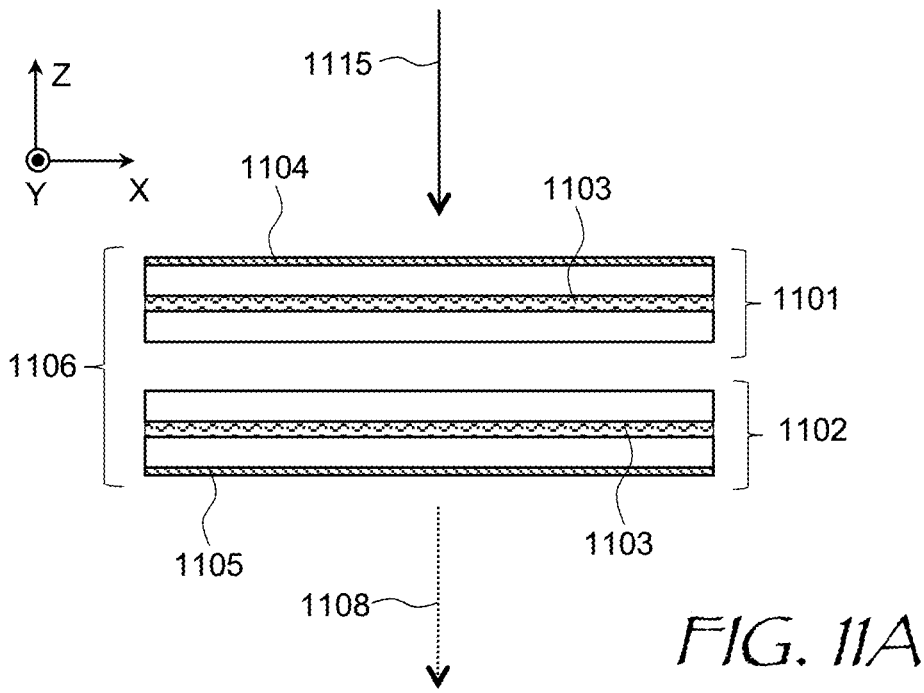
FIG. 11A is a side cross-sectional view of a compound amplitude/phase SLM of FIG. 9 including serially coupled in-plane switching (IPS) LC panels.

Turning to FIG. 11A for a non-limiting illustrative example of a transmissive dual-panel configuration. A transmissive SLM 1106 includes first 1101 and second in-plane switching (IPS) LC panels. Orientation of LC molecules in each pixel of the first 1101 and second IPS LC panels can be changed in-plane of the panels, i.e. in XY plane in FIG. 11A, by applying voltage to pairs of in-plane electrodes acting upon LC layers 1103.

In operation, an impinging illuminating light beam 1115 is polarized by a first linear polarizer 1104. Depending on the orientation of the LC molecules w.r.t. the transmission axis of the first linear polarizer 1104, a portion of the illuminating light beam 1115 propagated through a pixel of the first 1101 and second 1102 IPS LC panels may change its polarization state, or may retain original polarization state. The state of polarization will be converted into optical power density or intensity after propagating through a second linear transmission polarizer 1105, forming an image light beam 1108. In the embodiment shown, the transmissive SLM 1106 is absent a linear polarizer between the first 1101 and second 1102 IPS LC panels.

Figure 11B:
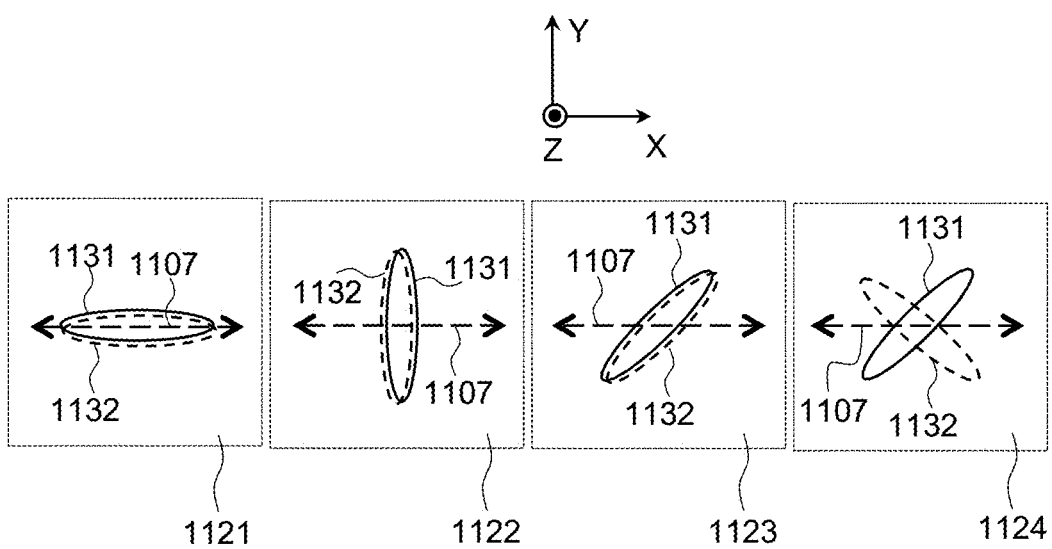
FIG. 11B is a plan magnified of the view of four pixels of the compound amplitude/phase SLM of FIG. 11A.

The operation of the transmissive SLM 1106 is further illustrated in FIG. 11B, which shows four pixels 1121-1124 of the first 1101 and second 1102 IPS LC panels. The transmission axes 1107 of the first linear polarizer 1104 and the second linear polarizer 1105 are horizontal, i.e. the transmission axes 1107 are parallel to X-axis. LC molecules 1131 of the first IPS LC panel 1101 are shown with solid lines, and LC molecules 1132 of the second IPS LC panel 1102 are shown with dashed lines. In a first pixel 1121, both are oriented parallel to X-axis, i.e. parallel to the transmission axes of the first 1104 and second 1105 linear polarizers. At this configuration, the polarization of the propagating illuminating light beam 1115 (propagating along Z-axis) does not change, and the illuminating light beam 1115 will propagate through the second polarizer 1105.

In a second pixel 1122, the LC molecules 1131 of the first IPS LC panel 1101 and LC molecules 1132 of the second IPS LC panel 1102 are oriented parallel to Y-axis, i.e. perpendicular to the transmission axes of the first 1104 and second 1105 linear polarizers. At such configuration, the polarization of the propagating illuminating light beam 1115 does not change, and the illuminating light beam 1115 will propagate through the second polarizer 1105. What is different, however, is the amount of the phase delay: due to the perpendicular orientation of the LC molecules 1131, 1132 to the polarization direction, the effective refractive index is smaller than in the case of the first pixel 1121 and, accordingly, the phase delay will be less in the second pixel 1122 as compared to the first pixel 1121.

In a third pixel 1123, the LC molecules 1131 of the first IPS LC panel 1101 and LC molecules 1132 of the second IPS LC panel 1102 are oriented at 45 degrees w.r.t. the X-axis, i.e. at 45 degrees to the transmission axes of the first 1104 and second 1105 linear polarizers. At such configuration, the polarization of the propagating illuminating light beam 1115 is rotated by 90 degrees, and the portion of the illuminating light beam 1115 impinging onto the third pixel 1123 will be blocked by the second polarizer 1105.

In a fourth pixel 1124, the LC molecules 1131 of the first IPS LC panel 1101 and LC molecules 1132 of the second IPS LC panel 1102 are oriented at +/−45 degrees w.r.t. the X-axis, i.e. at +/−45 degrees to the transmission axes of the first 1104 and second 1105 linear polarizers. At such configuration, the polarization of the propagating illuminating light beam 1115 does not change, and the illuminating light beam 1115 will propagate through the second polarizer 1105. What is different, however, is the amount of the phase delay. Thus, phase delay and the attenuation may be both adjusted by the transmissive SLM 1106.

Referring now to FIG. 12, a method 1200 for displaying content to a user includes directing (1202) an illuminating light beam onto an SLM including sequentially coupled first and second pixelated SLM panels such as, for example, the reflective SLM 1006 of FIG. 10 or the transmissive SLM 1106 of FIGS. 11A and 11B. The first and second pixelated SLM panels are used (1204) to spatially modulate the illuminating light beam in amplitude and phase as explained above. The first pixelated SLM panel may operate in transmission to spatially modulate the illuminating light beam in amplitude, while the second pixelated SLM panel may operate in reflection to spatially modulate the illuminating light beam in phase, as in the compound reflective SLM 1006 of FIG. 10. In some embodiments, e.g. in the one presented in FIG. 11A, both SLM panels operate in transmission. As a result of the modulation, an image light beam is obtained.

The image light beam is received (1206) at an ocular lens such as, for example, the ocular lens 634 of the holographic display 600 of FIG. 6. The ocular lens forms an image at an eyebox at a focal plane of the ocular lens for observation by an eye of the user, e.g. the eye 126. The image light beam may also be redirected (1208) e.g. using the beam redirector 638 of the holographic display 600 of FIG. 6, to shift the formed image. The modulation by the SLM may need to be adjusted for the new location of the formed image. The beam redirection and focusing functions may be performed by a single combined element.

Non-limiting exemplary embodiments of beam redirectors of this disclosure will now be considered. Referring first to FIG. 13, a tunable LC beam redirector 1338 includes an LC layer 1302 between first 1311 and second 1312 substrates with electrode structures for applying voltage gradients to the LC layer 1302. When a voltage gradient applied to the LC layer 1302, the LC fluid responds by changing its effective refractive index. An incoming wavefront 1310 is delayed with a spatially variable delay, e.g. gradually increasing delay in going from left to right in FIG. 13, causing an outgoing wavefront 1320 to be tilted. It is to be noted that the flat wavefront 1310 is used herein as an example. Non-flat wavefronts i.e. the image light modulated by the SLM, may also be redirected by the tunable LC beam redirector 1338.

Referring now to FIGS. 14A and 14B, a PBP beam redirector 1438 is based on an active PBP LC grating including a layer 1402 of LC material with spatially varying orientation of LC molecules, so as to define a PBP grating pattern which may be "erased" by application of voltage across the layer of LC material. In FIG. 14A, the PBP LC grating is in OFF state, such that its LC molecules are disposed predominantly in the plane of the layer 1402, i.e. in XY plane. When an incoming light beam 1408 is left-circular polarized (LCP), the PBP LC grating redirects the beam 1408 upwards, which becomes right-circular polarized (RCP). The RCP deflected 1408 is shown with solid lines. When an incoming light beam 1408 is right-circular polarized (RCP), the PBP LC grating redirects the beam 1408 downwards, which becomes left-circular polarized (LCP). The LCP deflected beam 1408 is shown with dashed lines. Applying a voltage to the PBP LC grating reorients the LC molecules as shown in FIG. 14B. As a result, the light beam 1408 retains its original direction, whether it is LCP or RCP. Thus, the active PBP LC grating has a variable beam steering property. To provide more steering angle values, a stack of PBP LC gratings may be used, e.g. a binary stack where the deflection angles by different PBP LC layers are in a binary relationship with respect to each other. Furthermore, the beam redirector configurations considered herein may include an element providing tunable optical power (i.e. refocusing power) to the beam redirector.

Non-limiting exemplary embodiments of ocular lenses for use in holographic displays of this disclosure will now be considered. Referring to FIG. 15, a pancake lens 1534 may be used as an ocular lens in a holographic display of this disclosure. The pancake lens 1534 includes opposed first 1511 and second 1512 reflectors with optional first 1501 and second 1502 refractive lens elements disposed in series between the first 1511 and second 1512 reflectors. The first reflector 1511 is configured to at least partially transmit a light beam 1508 through the first reflector 1511 to impinge onto the second reflector 1512. The second reflector 1512 is configured to at least partially reflect the light beam 1508 propagated through the first reflector 1511 back to the first reflector 1511. The first reflector 1511 is further configured to at least partially reflect the light beam 1508 reflected by the second reflector 1512 back to the second reflector 1512. The second reflector 1512 is further configured to at least partially transmit the light beam 1508 reflected by the first reflector 1511, to the eye pupil 1550.

Figure 15A:
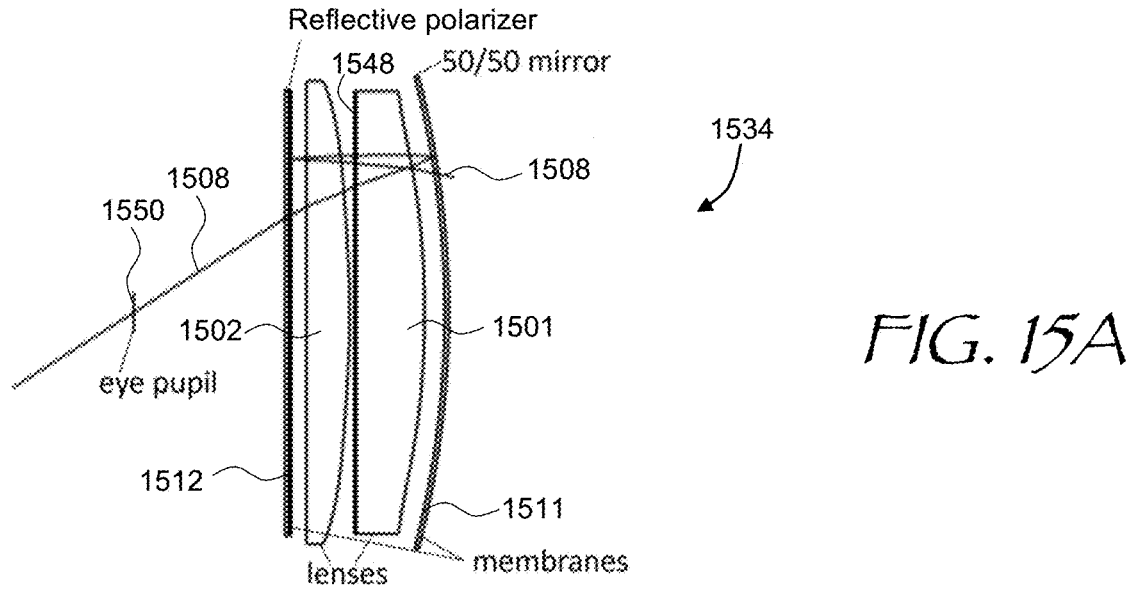
FIG. 15A is a side schematic view of an ocular lens for a holographic display of this disclosure.

The pancake lens 1534 has optical power, i.e. focusing or defocusing power, due to presence of elements having optical power. For instance, the first reflector 1511 may be curved as shown in FIG. 15A. The optional first 1501 and second 1502 refractive lens elements may also provide optical power for the pancake lens 1534. The curvature of individual optical elements may be selected so as to offset or reduce overall optical aberrations.

The first reflector 1511 may be a partially reflective mirror such as, for example, a 50/50 mirror which reflects the same amount of light as it transmits; that is, the optical power density of the transmitted and reflected light is the same. The second reflector 1512 may be a reflective polarizer, e.g. a linear reflective polarizer. The pancake lens 1534 may further include a quarter-wave plate (QWP) 1548 disposed between the first 1511 and second 1512 reflectors for converting a polarization state of the light beam 1508 from a first polarization state to a second, orthogonal polarization state upon a double pass propagation of the light beam through the QWP 1508. In FIG. 15A, the QWP 1548 is shown laminated onto the first refractive lens element 1501 as a non-limiting example.

Figure 15B:
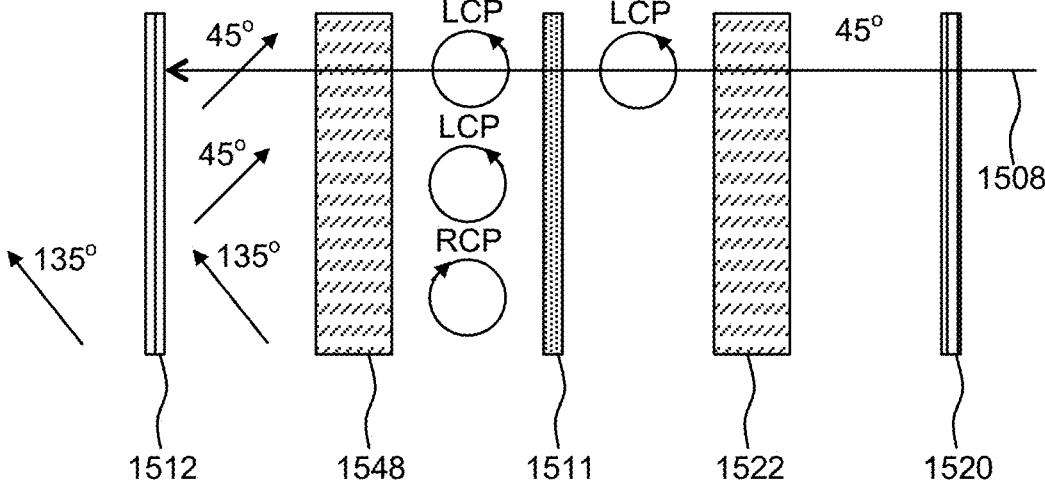
FIG. 15B is a polarization diagram of the ocular lens of FIG. 15A.

FIG. 15B provides an illustration of implementing the folded optical path of the light beam 1508 by using a reflective polarizer, a QWP, and a partial reflector. A linear transmission polarizer 1520 may be coupled to an upstream QWP 1522. The light beam 1508 emitted is left-circular polarized (LCP) upon propagating through the upstream QWP 1522.

The LCP light beam 1508 propagates through the first reflector 1511, i.e. the 50/50 reflector in this embodiment, and impinges onto the QWP 1548, which converts the polarization state to a linear polarized state at 45 degrees. The second reflector 1512, i.e. the linear reflective polairer in this embodiment, is configured to reflect the 45 degrees linearly polarized light, so the light beam 1508 is reflected from the second reflector 1512 to propagate back through the QWP 1548, which converts the polarization state back to LCP. Upon reflection from the first reflector 1511, the LCP light beam 1508 becomes right circular polarized (RCP), because the direction of propatation of the light beam 1508 changes. The RCP light beam 1508 propagates through the QWP 1548, becomes linearly polarized at 135 degrees, and is transmitted by the reflcetive polarizer to the eye pupil 1550. It is to be noted that the polarization states and angles of linear polarization are only meant as an example, and other configurations for folding a light beam path by polarization are possible.

The lens 1534 is an embodiment of a pancake lens usable as an ocular lens of a holographic display. The polarization beam folding of the pancake lens enables a very compact overall NED configuration. Such pancake lens includes a partial reflector (the first reflector 1511); a linear reflective polarizer (the second reflector 1512); and a quarter-wave plate (the QWP 1548) in an optical path between the partial reflector and a linear reflective polarizer. At least one of the partial reflector or linear reflective polarizer may be curved to provide optical power for the pancake lens.

Figure 16A:
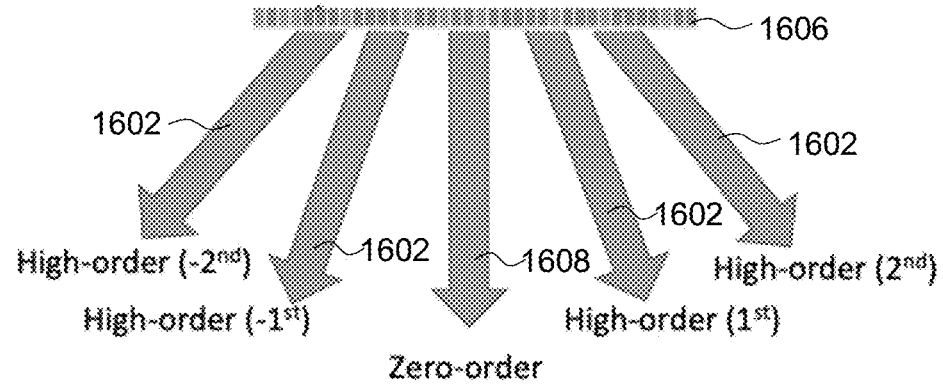
FIG. 16A is a side view of an SLM showing multiple orders of diffraction.
Figure 16B:
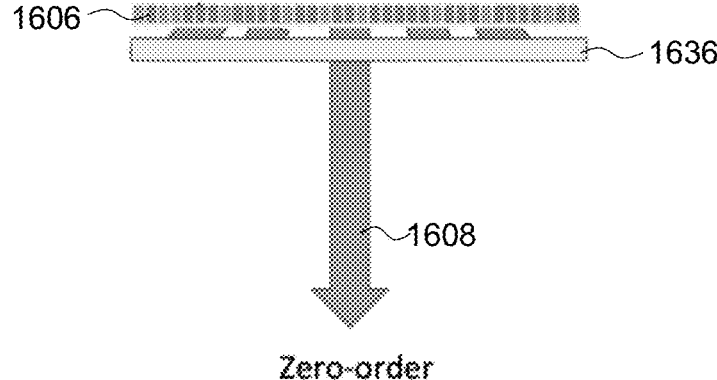
FIG. 16B is a side view of a low-pass spatial filter for blocking the higher orders of diffraction.

Referring to FIGS. 16A and 16B, an angular filter 1636 (FIG. 16B) may be placed downstream of the SLMs of the holographic displays of FIGS. 1-4, FIG. 6, and FIG. 8B. The angular filter 1636 is placed downstream of SLM 1606 to remove or suppress diffraction orders 1602 of a light beam 1608 impinging onto on the SLM, thus reducing the formation of ghost images. The angular filter 1636 may include e.g. a volume Bragg grating (VBG) filter that suppresses light propagation directions exceeding a threshold beam angle, such that the zeroth order of diffraction of the image light beam 1608 propagates through the angular filter 1636 while higher orders of diffraction, i.e. the first order, the second order, etc., are blocked.

Figure 17:
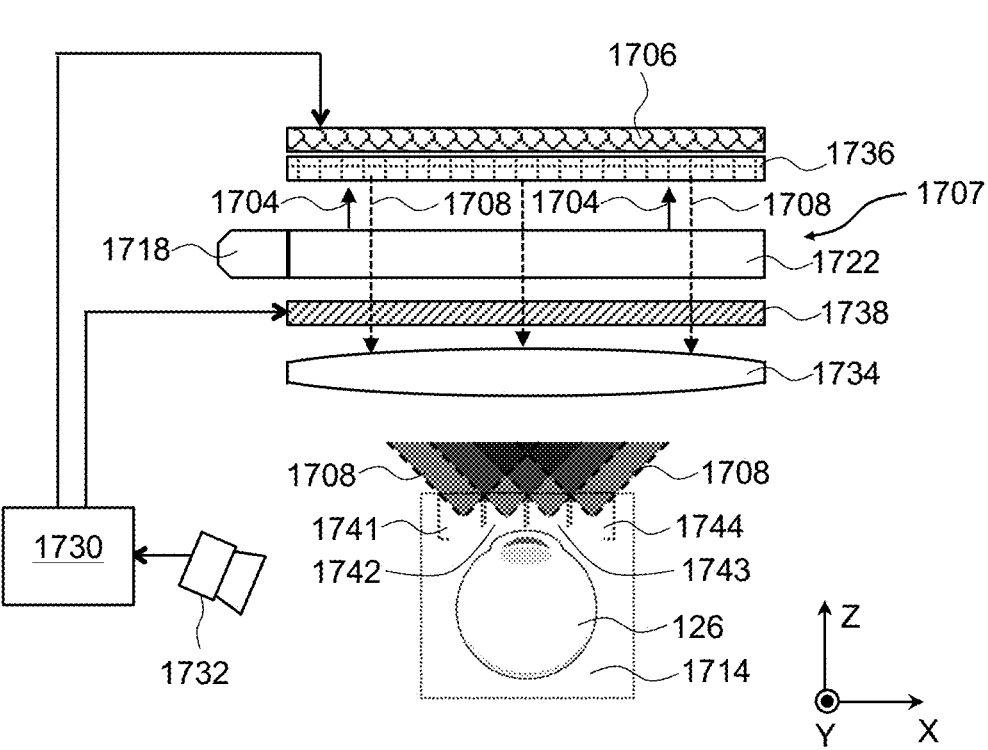
FIG. 17 is a schematic view of a holographic display with multiple exit pupils generated in a time-sequential manner.

Turning now to FIG. 17, a holographic display 1700 includes an illuminator 1707 for providing an illuminating light beam 1704. The illuminator 1707 may include a light source 1718 coupled to a beam expander 1722. The beam expander 1722 may include any of the beam expanders considered herein, e.g. the multi-beam expanders 522A, 522B, or 522C of FIGS. 5A to 5C respectively, the evanescent beam expander 722 of FIG. 7, the diffractive beam expander 822A or 822B of FIGS. 8A and 8B respectively, etc.

The holographic display 1700 includes an SLM 1706 operably coupled to the illuminator 1707 in a frontlight configuration, for receiving and spatially modulating the illuminating light beam 1704 to provide an image light beam 1708. The SLM 1706 may include any of the SLMs disclosed herein, e.g. the compound SLM 906 of FIG. 9, the MEMS-LC SLM 1006 of FIG. 10, and/or the dual IPS LC SLM 1106 of FIG. 11A. The image light beam 1708 propagates through an optional spatial filter 1736 such as, for example, the spatial filter 1636 of FIG. 16B, propagates through the illuminator 1707 (FIG. 17) and impinges onto a beam redirector 1738, for at least one of redirecting or refocusing the image light beam 1708. The beam redirector 1738 may include any of the beam redirectors disclosed herein, including without limitation the tunable LC beam redirector 1338 of FIG. 13 and/or the switchable PBP beam redirector 1438 of FIG. 14.

An ocular lens 1734 is operably coupled to the SLM 1706 for receiving the image light beam 1708 and forming an image at an eyebox 1714 of the holographic display 1700 for observation by a user's eye 1726. The ocular lens may include e.g. the pancake lens 1534 of FIG. 15A.

A controller 1730 is operably coupled to the SLM 1706 and the beam redirector 1738. The controller 1730 may be configured to operate the SLM 1706 and the beam redirector 1738 to provide holographic images at a grid of eyebox locations 1741, 1742, 1743, and 1744. To that end, at a first moment of time, the controller 1730 may cause the SLM 1706 to form the image downstream of the ocular lens 1734 at the first eyebox location 1741. At a second, subsequent moment of time, the controller 1730 may cause the SLM 1706 to form the image downstream of the ocular lens at the second eyebox location 1742 offset from the first eyebox location, and so on. To offset the location, the controller 1730 may operate the beam redirector 1738 placed upstream of the ocular lens 1738. It is to be noted that the controller 1730 may need to re-compute the hologram to be displayed by the SLM 1706 at the offset eyebox locations.

The controller 1730 may be configured to form the image at the grid of eyebox locations 1741 . . . 1744 extending at least one of laterally or longitudinally around a center of the grid, i.e. extending along X, Y, and/or Z axes. An eye tracking system 1732 may be provided for determining a location of a pupil of the user's eye 1726 in the eyebox 1714. The controller 1730 may then select the grid for providing the images such that the center of the grid is disposed at the location of the user's eye pupil. This enables one to effectively expand the viewing area of the holographic image. The expanded viewing area enables a larger variation in the eye relief distance and the eye locations in the eyebox. This relaxes the tolerances on the eye position required to observed the holographic image.

Figure 18A:
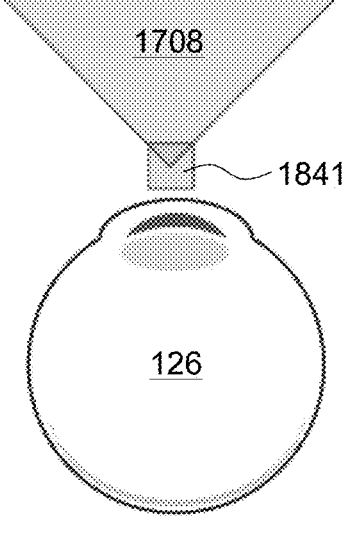
FIGS. 18A and 18B are schematic views of the multiple exit pupils generated by the holographic display of FIG. 17.
Figure 18B:
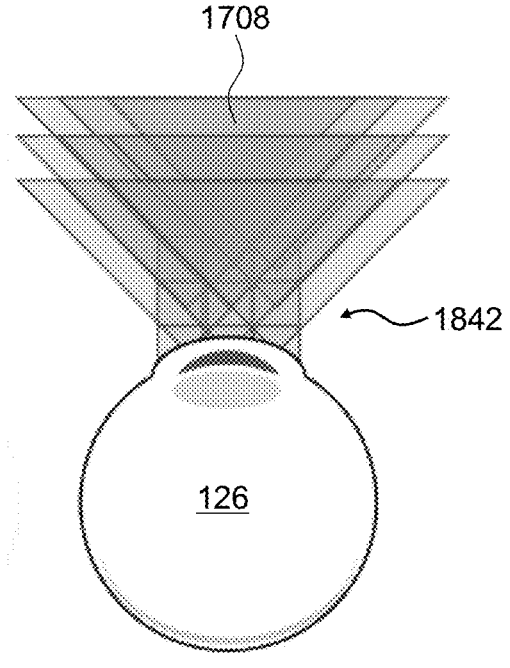

The effect of expanding the viewing area, i.e. the expanded eyebox of a holographic display, is illustrated in FIGS. 18A and 18B. FIG. 18A illustrates a holographic display without time-sequential eyebox replication. In FIG. 18A, the holographic image is formed at a small box 1841. Any deviation of the eye 126 from being centered on the box 1841 causes the holographic image to fade away. FIG. 18B illustrates a holographic display with the time-sequential eyebox replication. In FIG. 18B, the holographic image is formed at a grid 1842 of boxes in a time-sequential manner, e.g. the image is formed at a first box of the grid 1842 in a first time interval, at a second, different box of the grid 1842 in a second time interval, and so on. The grid 1842 of boxes is centered on the eye 126 or, more specifically, at its pupil. When the eye 126 deviates from the nominal location at the center of the grid, the eye 126 is still able to view the holographic image for as long as the eye 126 remains within the grid limits. When the eye 126 deviates from the grid limits, the eye tracking system 1732 (FIG. 17) senses the new eye location, allowing the controller 1730 to shift the grid to the new eye location.

Figure 19:
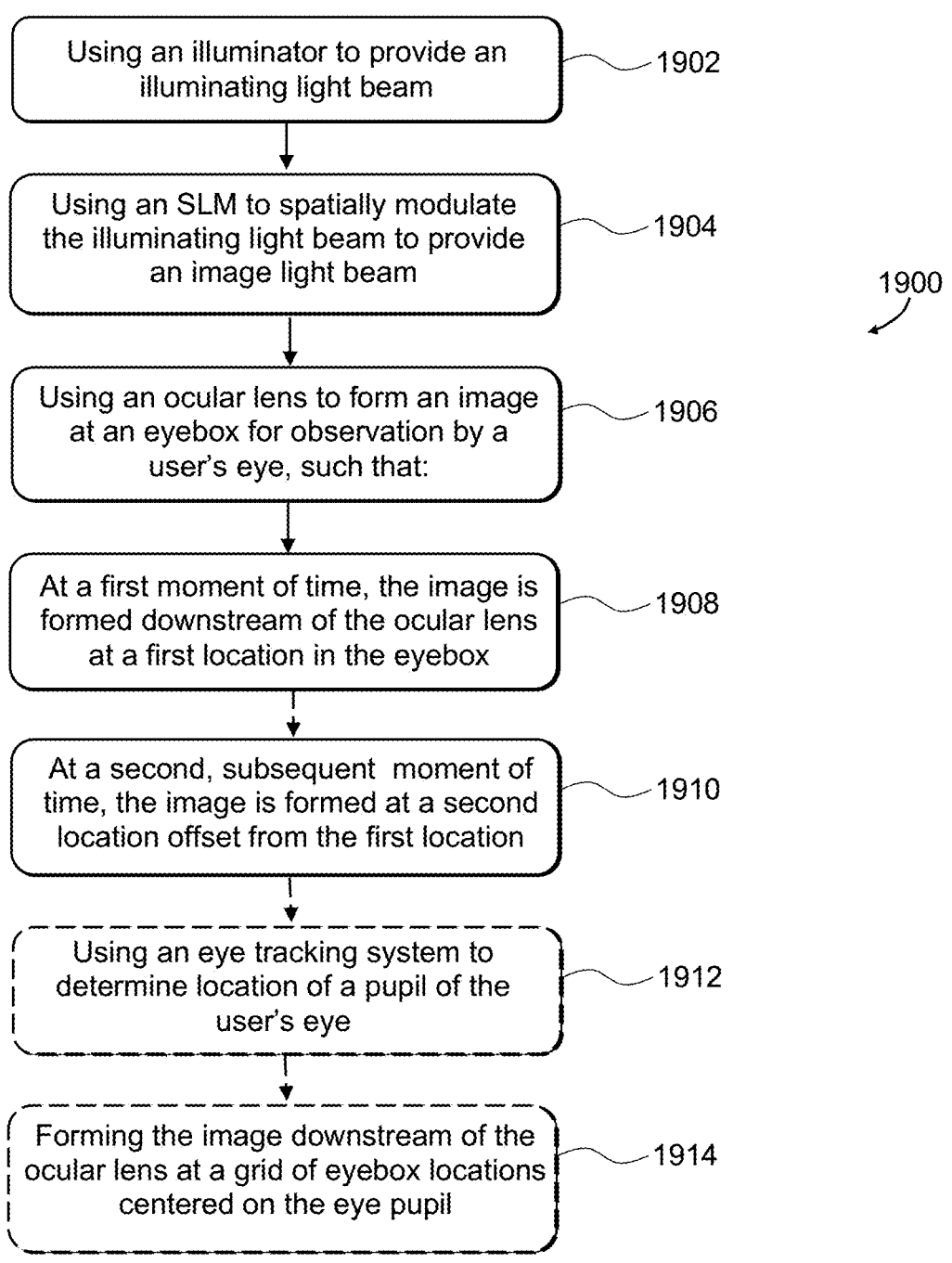
FIG. 19 is a flow chart of a method for displaying an image with multiple exit pupils generation.

Referring now to FIG. 19 with further reference to FIG. 17, a method 1900 for displaying an image includes using an illuminator, e.g. the illuminator 1707 of FIG. 17, to provide (FIG. 19; 1902) an illuminating light beam. An SLM, e.g. the SLM 1706, is used to spatially modulate (1904) the illuminating light beam to provide an image light beam. An ocular lens, e.g. the ocular lens 1734, receives (1906) the light beam and forms an image at an eyebox, e.g. the eyebox 1714, for observation by the user's eye 126. A beam redirector, e.g. the beam redirector 1738, redirects and/or refocuses the image light beam. The refocusing function may be performed by the ocular lens 1734. The SLM and the beam redirector/re-focuser operate such that at a first moment of time, the image is formed (1908) downstream of the ocular lens at a first eyebox location, and at a second, subsequent moment of time, the image is formed (1910) downstream of the ocular lens at a second eyebox location offset from the first eyebox location. As explained above with reference to FIGS. 17 and 18A, 18B, the image may be formed at a grid of eyebox locations extending at least one of laterally or longitudinally around a center of the grid. An eye tracking system, e.g. the eye tracking system 1732, may be used to determine (1912) a location of a pupil of the user's eye in the eyebox. The SLM and the beam redirector may then be used (1914) to form the image downstream of the ocular lens at the grid of eyebox locations, such that the center of the grid is disposed at the determined location of the user's eye pupil. For frontlight configurations with a reflective SLM, the image light beam may propagate through the frontlight illuminator and through the beam redirector. As explained above, the beam redirector may use a tunable LC steerer and/or a stack of active PBP layers to redirect the image light.

Figure 20:
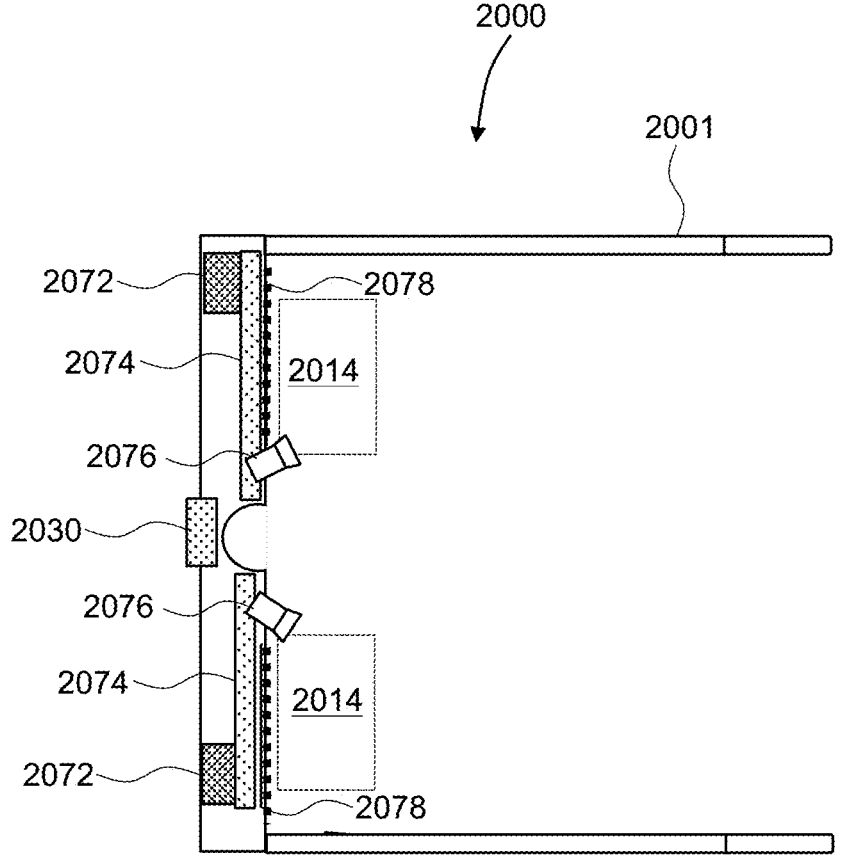
FIG. 20 is a view of an augmented reality (AR) display of this disclosure having a form factor of a pair of eyeglasses.

Referring to FIG. 20, an AR/VR near-eye display 2000 includes a frame 2001 having a form factor of a pair of eyeglasses. The frame 2001 supports, for each eye: an illuminator assembly 2072; an optical stack 2074 coupled to the assembly 2072; an eye-tracking camera 2076; and a plurality of eyebox illuminators 2078 (shown as black dots) for illuminating an eye in an eyebox 2014. The eye illuminators 2078 may be supported by the optical stack 2074. For AR applications, the optical stack 2074 can be transparent or translucent to enable the user to view the outside world together with the images projected into each eye and super-imposed with the outside world view. The images projected into each eye may include objects disposed with a simulated parallax, so as to appear immersed into the real world view.

The illuminator assembly 2072 may include any of the illuminators/light sources disclosed herein, for example the illuminator 102—SLM 106 stack of the holographic display 100 of FIG. 1, the illuminator 202—SLM 206 stack of the holographic display 200 of FIG. 2, the light source 318 of the holographic display 300 of FIG. 3, the illuminator 418 of the holographic display 400 of FIG. 4, the light source 618 of the holographic display 600 of FIG. 6, and/or the light source 1718 of the holographic display 1700 of FIG. 17. The optical stack 2074 may include any of the full-aperture optical elements or stacks disclosed herein. Herein, the term "full-aperture" means extending over most of the field of view of a user's eye placed in the eyebox 2014. Examples of full-aperture elements or stacks include e.g. the replicating lightguide 112 of the display 100 of FIG. 1, the replicating lightguide 212 of the display 200 of FIG. 2, the stack of the SLM 306, the replicating lightguide 322, and the focusing element 334 of the display 300 of FIG. 3, and/or the stack of the SLM 406, the angular filter 436, the replicating lightguide 422, the beam redirector 438, and the focusing element 434 of the display 400 of FIG. 4. Other examples of full-aperture stacks include the stacks of optical elements or layers between and including the SLM and the beam redirecting/focusing elements of the holographic display 600 of FIG. 6 and the holographic display 1700 of FIG. 17.

The purpose of the eye-tracking cameras 2076 is to determine position and/or orientation of both eyes of the user. Once the position and orientation of the user's eyes are known, the eye pupil positions are known, a controller 2030 of the AR/VR near-eye display 2000 may compute the required SLM phase and/or amplitude profiles to form an image at the location of the eye pupils, as well as to redirect light energy to impinge onto the eye pupils. A gaze convergence distance and direction may also be determined. The imagery displayed may be adjusted dynamically to account for the user's gaze, for a better fidelity of immersion of the user into the displayed augmented reality scenery, and/or to provide specific functions of interaction with the augmented reality.

In operation, the eye illuminators 2078 illuminate the eyes at the corresponding eyeboxes 2014, to enable the eye-tracking cameras 2076 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 2014.

The controller 2030 may then process images obtained by the eye-tracking cameras 2076 to determine, in real time, the eye gazing directions of both eyes of the user. In some embodiments, the image processing and eye position/orientation determination functions may be performed by a dedicated controller or controllers, of the AR/VR near-eye display 2000.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 21:
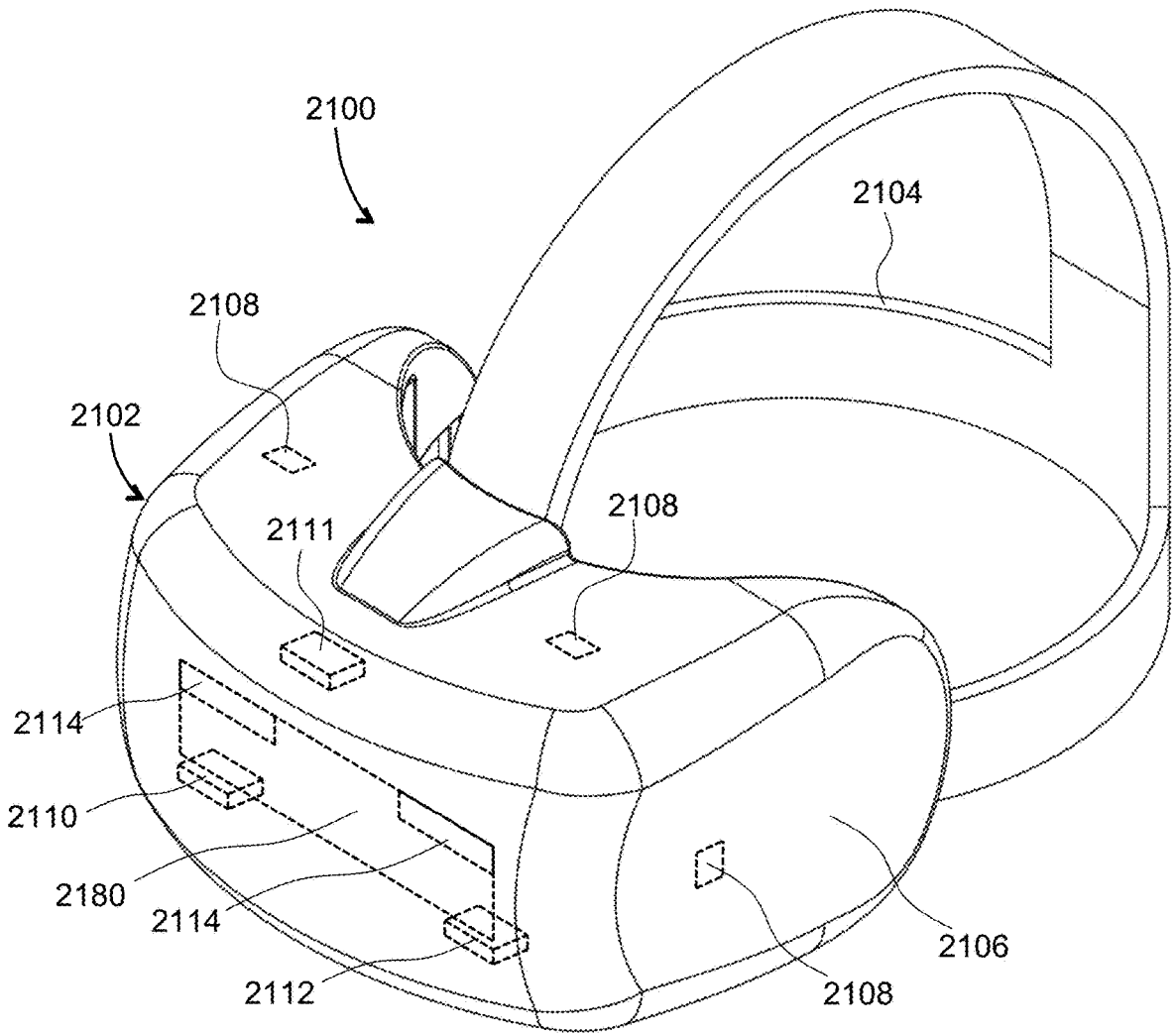
FIG. 21 is an isometric view of a head-mounted virtual reality (VR) display of this disclosure.

Turning to FIG. 21, an HMD 2100 is an example of an AR/VR wearable display system which encloses the user's face, for a greater degree of immersion into the AR/VR environment. Any of the displays considered herein may be used in the HMD 2100. The function of the HMD 2100 is to augment views of a physical, real-world environment with computer-generated imagery, or to generate the entirely virtual 3D imagery. The HMD 2100 may include a front body 2102 and a band 2104. The front body 2102 is configured for placement in front of eyes of a user in a reliable and comfortable manner, and the band 2104 may be stretched to secure the front body 2102 on the user's head. A display system 2180 may be disposed in the front body 2102 for presenting AR/VR imagery to the user. The display system 680 may include any of the displays considered herein, e.g. the holographic display 100 of FIG. 1, the holographic display 200 of FIG. 2, the holographic display 300 of FIG. 3, the holographic display 400 of FIG. 4, the holographic display 600 of FIG. 6, and the holographic display 1700 of FIG. 17. Sides 2106 of the front body 2102 may be opaque or transparent.

In some embodiments, the front body 2102 includes locators 2108 and an inertial measurement unit (IMU) 2110 for tracking acceleration of the HMD 2100, and position sensors 2112 for tracking position of the HMD 2100. The IMU 2110 is an electronic device that generates data indicating a position of the HMD 2100 based on measurement signals received from one or more of position sensors 2112, which generate one or more measurement signals in response to motion of the HMD 2100. Examples of position sensors 2112 include: one or more accelerometers, one or more gyroscopes, one or more magnetometers, another suitable type of sensor that detects motion, a type of sensor used for error correction of the IMU 2110, or some combination thereof. The position sensors 2112 may be located external to the IMU 2110, internal to the IMU 2110, or some combination thereof.

The locators 2108 are traced by an external imaging device of a virtual reality system, such that the virtual reality system can track the location and orientation of the entire HMD 2100. Information generated by the IMU 2110 and the position sensors 2112 may be compared with the position and orientation obtained by tracking the locators 2108, for improved tracking accuracy of position and orientation of the HMD 2100. Accurate position and orientation is important for presenting appropriate virtual scenery to the user as the latter moves and turns in 3D space.

The HMD 2100 may further include a depth camera assembly (DCA) 2111, which captures data describing depth information of a local area surrounding some or all of the HMD 2100. To that end, the DCA 2111 may include a laser radar (LIDAR), or a similar device. The depth information may be compared with the information from the IMU 2110, for better accuracy of determination of position and orientation of the HMD 2100 in 3D space.

The HMD 2100 may further include an eye tracking system 2114 for determining orientation and position of user's eyes in real time. The obtained position and orientation of the eyes also allows the HMD 2100 to determine the gaze direction of the user and to adjust the image generated by the display system 2180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 2102.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A holographic display comprising:

an illuminator comprising a substrate, a slab core layer on the substrate for guiding a light beam therein, a cladding layer on the slab core layer, and a light extractor on the cladding layer, the light extractor having a refractive index higher than an effective refractive index of a mode of propagation of light in the slab core layer, for evanescent out-coupling of the light beam from the slab core layer into the light extractor, thereby forming an illuminating light beam, wherein the light extractor further comprises a prism having first and second faces at an acute angle to one another, wherein:

the first face is coupled to the cladding layer, and the second face includes a reflector with a curved outer surface defined by a radius of curvature having an optical power for at least one of focusing or defocusing; and a spatial light modulator (SLM) operably coupled to the illuminator for receiving and spatially modulating the illuminating light beam in amplitude and phase to provide an image light beam.

2. The holographic display of claim 1, wherein a thickness of the cladding layer decreases in a direction of propagation of the light beam to improve a spatial uniformity of light extraction by the light extractor.

3. The holographic display of claim 1, wherein the cladding layer and the slab core layer are configured for singlemode propagation of the light beam in the slab core layer.

4. The holographic display of claim 1, further comprising an ocular lens operably coupled to the SLM for receiving the image light beam and forming an image at an eyebox of the holographic display for observation by a user's eye.

5. The holographic display of claim 4, further comprising a beam redirector in an optical path of the image light between the SLM and the ocular lens, for controllably redirecting the image light beam.

6. The holographic display of claim 5, wherein the beam redirector comprises a tunable liquid crystal redirector of the image light beam.

7. The holographic display of claim 5, wherein the beam redirector comprises a stack of active Pancharatnam-Berry phase (PBP) layers configured for switching a direction of propagation of the image light beam.

8. The holographic display of claim 5, further comprising:
an eye tracking system for determining a position of a pupil of the user's eye in the eyebox; and
a controller operably coupled to the eye tracking system and the beam redirector for causing the beam redirector to controllably redirect the image light beam towards the eye pupil position determined by the eye tracking system.

9. A holographic display comprising:
a beam expander comprising a diffractive layer for diffracting a collimated light beam at an angle of incidence exceeding an angle of diffraction, whereby a lateral size of the collimated light beam increases upon diffraction on the diffractive layer;
a spatial light modulator (SLM) operably coupled to the beam expander for receiving the light beam diffracted by the diffractive layer and spatially modulating the light beam in amplitude and phase to provide an image light beam, wherein in operation, the image light beam propagates through the diffractive layer; and
a light extractor including a prism having first and second faces at an acute angle to one another, wherein
the first face is coupled to a cladding layer, and
the second face includes a reflector with a curved outer surface defined by a radius of curvature with an optical power for at least one of focusing or defocusing.

10. The holographic display of claim 9, wherein the angle of incidence is at least 75 degrees, and the angle of diffraction is no greater than 15 degrees.

11. The holographic display of claim 9, the diffractive layer comprises a polarization volume hologram.

12. The holographic display of claim 9, wherein the diffractive layer comprises a volume Bragg grating.

13. The holographic display of claim 9, wherein the beam expander further comprises first and second prismatic elements each comprising a diagonal face, the first prismatic element further comprising a side face joining the diagonal face of the first prismatic element; and
wherein the diffractive layer is sandwiched between the diagonal faces of the first and second prismatic elements, and wherein in operation, the collimated light beam is received at the side face of the first prismatic element.

14. The holographic display of claim 9, further comprises an ocular lens operably coupled to the SLM for receiving the image light beam and forming an image at an eyebox of the holographic display for observation by a user's eye.

15. The holographic display of claim 14, further comprising a beam redirector in an optical path of the image light between the SLM and the ocular lens, for controllably redirecting the image light beam.

16. The holographic display of claim 15, wherein the beam redirector comprises a tunable liquid crystal beam redirector.

17. The holographic display of claim 15, wherein the beam redirector comprises a stack of active Pancharatnam-Berry phase (PBP) layers configured for switching a direction of propagation of the image light beam.

18. The holographic display of claim 15, further comprising:
an eye tracking system for determining a position of a pupil of the user's eye in the eyebox; and
a controller operably coupled to the eye tracking system and the beam redirector for causing the beam redirector to controllably redirect the image light beam towards the eye pupil position determined by the eye tracking system.

19. A holographic display comprising:
a frontlight illuminator for providing an illuminating light beam;
a spatial light modulator (SLM) operably coupled to the frontlight illuminator for receiving and spatially modulating the illuminating light beam in amplitude and phase to provide an image light beam propagating through the frontlight illuminator;
a light extractor including a prism having first and second faces at an acute angle to one another, wherein
the first face is coupled to a cladding layer, and
the second face includes a reflector with a curved outer surface defined by a radius of curvature with an optical power for at least one of focusing or defocusing;
an ocular lens operably coupled to the SLM for receiving the image light beam and forming an image at an eyebox of the holographic display for observation by a user's eye; and
a low-pass spatial filter in an optical path of the image light beam between the SLM and the ocular lens, for blocking higher orders of diffraction of the illuminating light beam on the SLM while propagating a zeroth order of diffraction of the illuminating light beam.

* * * * *